(12) United States Patent
Haddock, Jr.

(10) Patent No.: US 12,455,773 B2
(45) Date of Patent: Oct. 28, 2025

(54) SYSTEMS AND METHODS FOR ALLOCATING SYSTEM RESOURCES USING DUAL-LIMIT ACCOUNT PROVISIONING

(71) Applicant: Contentstack Inc., San Francisco, CA (US)

(72) Inventor: Billy Dean Haddock, Jr., Jacksonville Beach, FL (US)

(73) Assignee: Contentstack Inc., San Francisco, CA (US)

( * ) Notice: Subject to any disclaimer, the term of this patent is extended or adjusted under 35 U.S.C. 154(b) by 458 days.

(21) Appl. No.: 18/161,530

(22) Filed: Jan. 30, 2023

(65) Prior Publication Data

US 2024/0256354 A1 Aug. 1, 2024

(51) Int. Cl.
*G06F 9/50* (2006.01)
*G06F 9/54* (2006.01)

(52) U.S. Cl.
CPC ............ *G06F 9/505* (2013.01); *G06F 9/5033* (2013.01); *G06F 9/541* (2013.01)

(58) Field of Classification Search
CPC ......... G06F 9/505; G06F 9/5033; G06F 9/541
See application file for complete search history.

(56) References Cited

U.S. PATENT DOCUMENTS 9,059,938 B1 * 6/2015 Strand .................... H04L 67/02

* cited by examiner

*Primary Examiner* — Wissam Rashid
(74) *Attorney, Agent, or Firm* — Dority & Manning, P.A.

(57) ABSTRACT

Example embodiments of the present disclosure provide for an example method including maintaining a key values dictionary including a first feature, a first threshold utilization level associated with the first feature, and a second threshold utilization level associated with the first feature. The example method includes obtaining user session initiation data associated with a headless content management service. The example method includes obtaining first utilization level data for the first feature. The example method includes determining that the first utilization level is above the first threshold utilization level. The example method includes performing a first-tier action responsive to determining the first utilization level is high. The example method includes determining a second utilization level is above a second threshold. The example method includes performing a second-tier action responsive to determining the second utilization level is above the second threshold.

20 Claims, 12 Drawing Sheets

Create Plan — 800

- 810 → Plan ID: 10
- 815 → Save Plan as a Template
  ☑ Check this box to use these settings as a Template when creating future Plans
- 820 → Plan Name: 10
- 825 → Price: 10
- 830 → Message: 10
- 835 → Blocked Asset Types: 10
  Comma-separated values(e.g., image/ svg, application/x
- 840 → Select Template: Trial Plan - Summer Special 2022
- 845 → User Administration Settings

| Key | Value | Limit | Enabled |
|---|---|---|---|
| Users<br>users |  |  | ☑ |
| Single Sign On ( SSO)<br>sso |  |  | ☑ |

850 — Organization Settings

| Key | Value | Limit | Enabled |
|---|---|---|---|
| Stacks<br>stacks | | | ☑ |
| Content Types<br>content_types | | | ☑ |
| IdP Role Mapping<br>ssoRoles | | | ☑ |
| Multiple SSO Entities<br>ssoEntityId | | | ☐ |

855 — Stack Settings

| Key | Value | Limit | Enabled |
|---|---|---|---|
| Stacks<br>stacks | | | ☑ |
| Content Types<br>content_types | | | ☑ |

FIG. 8B

SYSTEMS AND METHODS FOR ALLOCATING SYSTEM RESOURCES USING DUAL-LIMIT ACCOUNT PROVISIONING

FIELD

The present disclosure relates generally to systems and methods for allocating system resources of a content management system using dual-limit account provisioning.

BACKGROUND

Computing devices can interact with other devices over networks to generate, modify, and publish content. For instance, a computing device can be granted access to features associated with generating, modifying, and publishing content that can be accessed by third-party users.

SUMMARY

Aspects and advantages of embodiments of the present disclosure will be set forth in part in the following description, or can be learned from the description, or can be learned through practice of the embodiments.

In one example aspect, the present disclosure provides for an example system for allocating system resources using dual-limit account provisioning, including one or more processors and one or more memory device storing instructions that are executable to cause the one or more processors to perform operations. In some implementations, the one or more memory devices can include one or more transitory or non-transitory computer-readable media storing instructions that are executable to cause the one or more processors to perform operations. In the example system, the operations include maintaining a key values dictionary comprising at least a first feature, a first threshold utilization level associated with the first feature, and a second threshold utilization level associated with the first feature. In the example system, the operations include obtaining data indicative of initiation of a user session via a user interface of a user device, wherein the user interface comprises interactive elements associated with a headless content management service. In the example system, the operations include obtaining data indicative of a first utilization level for the first feature. In the example system, the operations include obtaining data associated with the first feature, the data comprising at least the first threshold utilization level and the second threshold utilization level. In the example system, the operations include determining that the first utilization level is above the first threshold utilization level based on comparing the first utilization level to the first threshold utilization level. In the example system, the operations include in response to determining that the first utilization level is above the first threshold utilization level, transmitting data which causes the user device to perform a first-tier action. In the example system, the operations include obtaining data indicative of a second utilization level for the first feature. In the example system, the operations include determining that the second utilization level is above the second threshold utilization level based on comparing the second utilization level to the second threshold utilization level. In the example system, the operations include in response to determining that the second utilization level is above the second threshold utilization level, transmitting data which causes the user device to perform second-tier action.

In an example aspect, the present disclosure provides for an example computer-implemented method. The example method includes maintaining a key values dictionary comprising at least a first feature, a first threshold utilization level associated with the first feature, and a second threshold utilization level associated with the first feature. The example method includes obtaining data indicative of initiation of a user session via a user interface of a user device, wherein the user interface comprises interactive elements associated with a headless content management service. The example method includes obtaining data indicative of a first utilization level for the first feature. The example method includes obtaining data associated with the first feature, the data comprising at least the first threshold utilization level and the second threshold utilization level. The example method includes determining that the first utilization level is above the first threshold utilization level based on comparing the first utilization level to the first threshold utilization level. The example method includes in response to determining that the first utilization level is above the first threshold utilization level, transmitting data which causes the user device to perform a first-tier action. The example method includes obtaining data indicative of a second utilization level for the first feature. The example method includes determining that the second utilization level is above the second threshold utilization level based on comparing the second utilization level to the second threshold utilization level. The example method includes in response to determining that the second utilization level is above the second threshold utilization level, transmitting data which causes the user device to perform second-tier action.

In an example aspect, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include maintaining a key values dictionary comprising at least a first feature, a first threshold utilization level associated with the first feature, and a second threshold utilization level associated with the first feature. In the example transitory or non-transitory computer readable medium, the operations include obtaining data indicative of initiation of a user session via a user interface of a user device, wherein the user interface comprises interactive elements associated with a headless content management service. In the example transitory or non-transitory computer readable medium, the operations include obtaining data indicative of a first utilization level for the first feature. In the example transitory or non-transitory computer readable medium, the operations include obtaining data associated with the first feature, the data comprising at least the first threshold utilization level and the second threshold utilization level. In the example transitory or non-transitory computer readable medium, the operations include determining that the first utilization level is above the first threshold utilization level based on comparing the first utilization level to the first threshold utilization level. In the example transitory or non-transitory computer readable medium, the operations include in response to determining that the first utilization level is above the first threshold utilization level, transmitting data which causes the user device to perform a first-tier action. In the example transitory or non-transitory computer readable medium, the operations include obtaining data indicative of a second utilization level for the first feature. In the example transitory or non-transitory computer readable medium, the operations include determining that the second utilization level is above the second threshold utilization level based on comparing the second utilization level to the second threshold utilization level. In the example transitory or non-transitory computer readable medium, the operations include in response to determining that the second utilization level is above the second threshold utilization level, transmitting data which causes the user device to perform second-tier action.

BRIEF DESCRIPTION OF THE DRAWINGS

Detailed discussion of embodiments directed to one of ordinary skill in the art is set forth in the specification, which makes reference to the appended figures, in which:

FIG. 8A-FIG. 8B depict example user interfaces according to example embodiments of the present disclosure.

DETAILED DESCRIPTION

Figure 1:
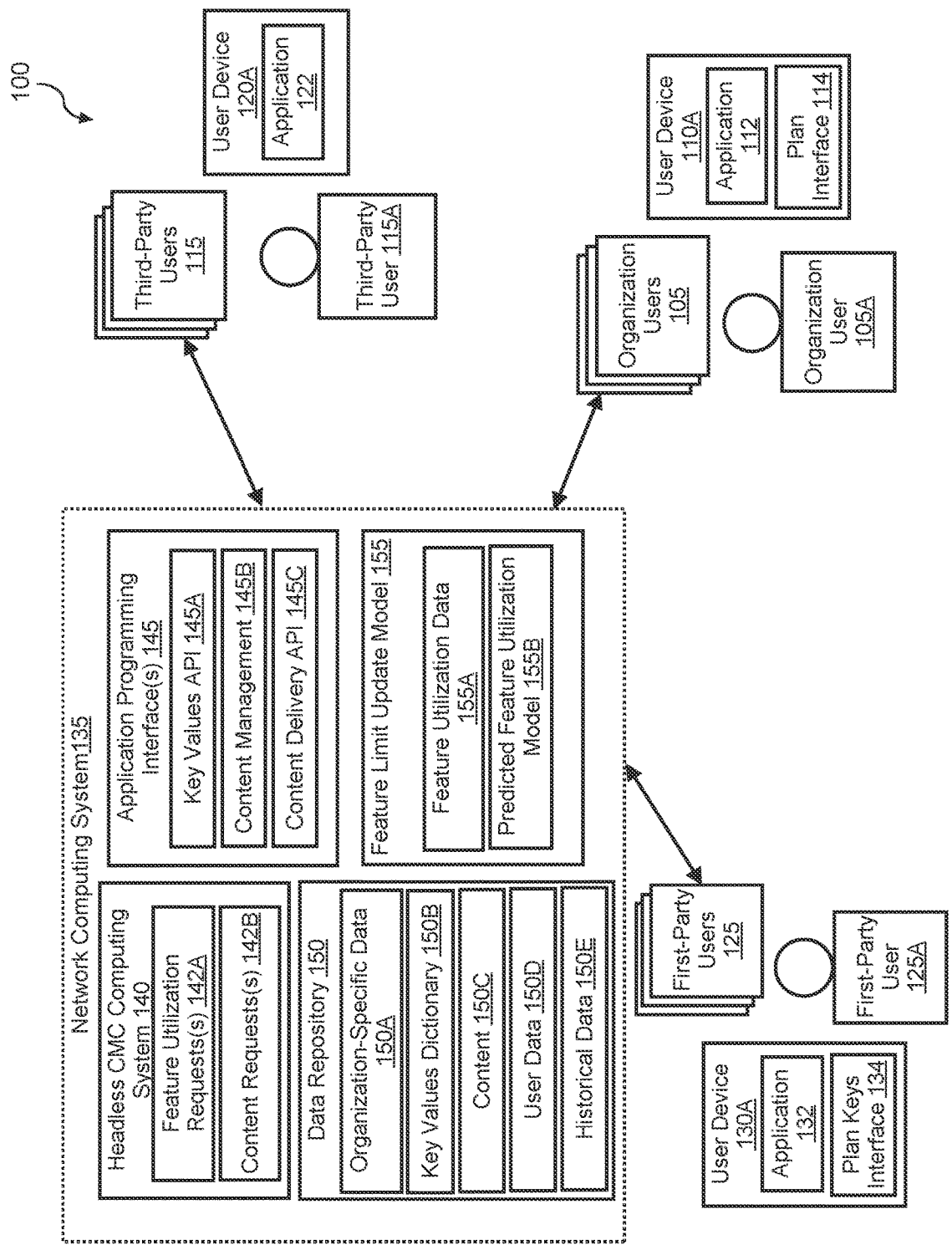
FIG. 1 depicts a block diagram of an example system for allocating system resources using dual-limit account provisioning according to example embodiments of the present disclosure.

The present disclosure provides for systems and methods directed to a dual-limit account provisioning system. The dual-limit account provisioning system can be implemented using a centralized key values dictionary, plan keys interface, and key values API. Keys can be associated with various features or functionalities of the computing system. For example, keys can include number of users, amount of a particular service request, or maximum reference depth for GraphQL query.

By generating a centralized key values dictionary for use with the plan keys interface and key values API, the computing system can provide for more seamless updates to plans and keys (e.g., making changes), scalability of plans, avoiding processing customer complaints indicative of incorrectly set keys, reducing reliance of manually created documents for enabling specific application features, and the like. Additionally, benefits include the generation of system architecture to lay the essential groundwork for centrally managing application features.

Additionally, the customized plans can call for limiting messages to particular users, groups of users (e.g., associated with a particular organization), or points of contacts for groups of users. Customized plans can include unique combinations of set key values. In some implementations, the keys can be set manually by a user. In some implementations, the keys can be automatically set or adjusted by the computing system based on utilization data. For instances, the keys can be associated with respective features that are accessible (or inaccessible) to a user based on an associated customized plan.

Cloud services can provide access to online computing resources for several individuals simultaneously. Access to features of cloud computing systems can be controlled by a headless CMS computing system. Existing methods provide for hard limits which block access to particular features or prevent further use once a limit is reached. Cutting off access can be disruptive to a user's experience with the cloud service and can lead to increased processing of customer complaints or repeated requests for additional access.

Creating and apportioning plans (e.g., allocations of computing resources) has historically been a highly manual process allowing for human error and decreased user satisfaction. Manual entry can also result in missing or improperly setting keys when keys are copied from one user to another (e.g., from an existing user plan to a new user plan) and is divorced from an analysis of the actual usage needs of a respective user or group of users. Additionally, notifications regarding usage and limits are generally not approached in a uniform manner.

The dual-tier access limiting can provide for improvement compared to existing methods. This can include setting soft and hard limits for particular features. In some implementations a service can be associated with hundreds of features. The computing system can generate or maintain a key values dictionary comprising settings for the first limit and second limit which affect user access to features. The centralized key values dictionary can include one or more features and associated feature settings. Features settings can include, for example, a first limit (e.g., soft limit) and a second limit (e.g., hard limit).

Dual-tier access limiting can allow for adjusting users' access to respective features at two distinct levels opposed to a single level. For instance, the first level can be associated with a lower first limit (e.g., soft limit). The lower first limit can be associated with a providing a user a notification that they are approaching an upper limit or can be associated with some other action. The second level can be associated with a higher second limit (e.g., hard limit). The higher second limit can be associated with making one or more features inaccessible to a user based on the user's utilization. In some instances, the dual-tier access limiting can include dynamic access. For instance, the utilization of a first feature can have a direct impact on the limits (e.g., first limit and second limit) associated with a second feature.

The dual-tiered approach allows for highly tailored feature settings while maintaining the integrity of the platform by managing excess utilization of resources to optimize computing resources available for the entire computing ecosystem (e.g., all user devices). For example, a specific organization (and associated users) can be granted an excess utilization of a particular feature for a limited time. The computing system can obtain data indicative of the user's utilization of a feature and can use the data indicative of utilization to adjust the limit levels moving forward. In some implementations, adjusting the limit levels can be performed using a feedback loop.

In some implementations, a first limit can be a lower limit. The lower limit can be indicative of a "soft" limit. When the computing system determines the user has reached the soft limit, the computing system can continue to allow a user to access or utilize a feature (e.g., in excess of a standard expected allocation of resources). In some implementations, the computing system can determine a user's utilization of a feature has reached the first limit, in response, the computing system can provide for display a message to the user indicating the user has reached a soft limit. In some implementations, the computing system can store data indicative of the user reaching the soft limit in a database. The computing system can provide for display messages, charts, graph data, key settings, or actual utilization relating to the user's utilization of various features of the service. The computing system can store this data to be communicated with a device associated with the first-party computing system, an organization computing system, or a third-party service computing system (e.g., an analytics service).

In some implementations a second limit can be an upper limit. The upper limit can be a limit on a particular feature that, when reached, can allow for the computing system to optionally block certain features based on an associated user plan.

The two-tiered approach additionally allows for messaging and enforcement flexibility at two distinct limit levels. The two-tiered system can be utilized for a plurality of implementations. Implementations can include, for example, templating, key values application programming interfaces (key values API), utilization analytics, or updates to limits based on utilization.

The present disclosure provides for technical benefits and effects. For example, by maintaining the two-tiered approach, global computing resource allocation for the computing system can be optimized by adjusting limits to distribute resource allocation to prevent issues, decrease processing, and the like. Additionally, the utilization data obtained can be analyzed by the computing system and used to set limits moving forward. This can lead to more efficient system processing and bandwidth usage. Additionally, machine learned models can be implemented to set limits more efficiently for users (or organizations comprising groups of users) to optimize allocation of the computing resources of the computing system.

With reference now to the Figures, example embodiments of the present disclosure will be discussed in further detail.

FIG. 1 depicts a block diagram of an example system 100 for allocating system resources using dual-limit account provisioning. As illustrated, FIG. 1 shows a computing system 100 that can include one or more organization users 105 (e.g., organization user 105A), one or more third-party users 115 (e.g., third-party user 115A), and one or more first-party users 125 (e.g., first-party user 125A).

Organization users 105 (e.g., organization user 105A) can be associated with one or more user devices (e.g., user device 110A). User device 110A can be any user device. For instance, user device 110A can be a computer, mobile device, tablet, or other devices. The user device 110A can include a software application 112 and a plan interface 114 associated with a content management service entity, which can run on the user device 110A. As described herein software application can include an application capable of accessing websites or web applications.

The computing system 100 can include one or more third-party users 115. The third-party users 115 can receive data indicative of content from organization users 105. For example, the third-party user 115A can submit a request through a user device 120A associated with the user (e.g., via a software application such as application 122).

The computing system 100 can include one or more first-party users 125. First-party users 125 can include first-party user 125A. First-party users 125 can be associated with one or more devices. For instance, first-party user 125A can be associated with user device 130A. The user device 130A can include a software application 132 and a plan keys interface 134. First-party users 125 can be associated with a headless content management system (headless CMS) service entity (e.g., associated with headless CMS computing system 140). First-party users 125 can include, for example, system engineers, product liaisons, business users, product managers, or administrators associated with the headless CMS service entity.

A headless content management system (headless CMS) can include a content management system configured to manage and organize content without a connected front-end or display later. For instance, a headless CMS can provide a platform to allow for creation, editing, and delivery of content to a plurality of front-end device interfaces. The headless CMS can allow for organization users 105 to generate or manage content item that can be stored in back-end servers (e.g., associated with network computing system 135) and provided for display to one or more third-party users 115 (e.g., third-party user 115A) via an interface of an associated user device (e.g., user device 120A). An example configuration for a headless CMS is described with regard to FIG. 2.

A headless CMS can provide for benefits including omnichannel content delivery, rapid content deployment (via API), modular content and assets, and limitless integrations that power next-level digital experiences. The benefits can additionally include supporting an unlimited number of digital channels compared to traditional CMS that require multiple parallel content management system instances to provide content to more than one digital channel (e.g., web and mobile). The API approach can facilitate quickly scaling or deploying new content channels. The content can be managed and deployed across touchpoints without being duplicated or reformatted due to the modular nature of the content (e.g., not being dependent on any specific front-end display). Additionally, the content can connect to a plurality of services and software removing prior silos from systems like CRM, Artificial Intelligence/Machine Learning (AI/ML), personalization tools, or localization platforms.

A network computing system 135 can include a computing system associated with a service entity that can facilitate headless content management between organization users 105 and third-party users 115. Network computing system 135 can include headless CMS computing system 140, application programming interfaces 145, data repository 150, and feature limit update model 155.

A headless CMS computing system 140 associated with the headless CMS service entity can facilitate the delivery of content from organization users 105 to third-party users 115 via associated user devices (e.g., user device 120A). The headless CMS computing system 140 can obtain data indicative of one or more feature utilization request(s) 142A from organization users 105. The headless CMS computing system 140 can obtain data indicative of one or more content requests 142 from third-party users 115.

Headless CMS computing system 140 can interface with the one or more user devices (e.g., user device 110A, 120A, or 130A) associated with one or more users (e.g., organization users 105, third-party users 115, or first-party users 125) using one or more application programming interfaces 145. For instance, first-party user devices (e.g., user device 130A) can interface with headless CMS computing system 140 via key values API 145A. For instance, organization user devices (e.g., user device 110A) can interface with headless CMS computing system 140 via content management API 145B. For instance, third-party user devices (e.g., user device 120A) can interface with headless CMS computing system 140 via content delivery API 145C.

First-party user 125 (e.g., first-party user 125A) can interact with headless CMS computing system 140 by providing input via a plan keys interface 134 via user device 130A. Headless CMS computing system 140 can obtain data indicative of first-party user 125A providing input indicative of one or more key values via plan keys interface 134. For instance, first-party user 125A input can be used to update data repository 150.

Data repository 150 can include organization-specific data 150A, key values dictionary 150B, content 150C, user data 150D, historical data 150E, or any other relevant data (e.g., system-level data associated with a plurality of users, expected demand for particular features, expected demand for particular content, and the like). Organization-specific data 150A can include data indicative of user permissions of one or more users associated with a respective organization. For instance, user permissions can include features that are available to the user based on a designated role of the user. User roles can include owner, admin, developer, content manager, or custom role. Key values dictionary 150B can include a plurality of keys (e.g., associated with features or functions). Key values dictionary 150B can include an identifier associated with the respective key, a value associated with the respective key, a max value associated with the respective key, and an enablement of a notification or enforcement of the respective key. In some implementations, key values dictionary 150B can interface via key values API 145A to cause the transmission of data indicative of at least one of (i) utilization of a feature, (ii) request for utilization of feature, (iii) notification regarding over utilization of a feature, or (iv) blocking use of a feature based on overutilization.

Keys values API 145A can be used for facilitating surfacing information in a plurality of interfaces. For instance, in an organization user facing interface (e.g., via user device 110A via plan interface 114), the keys value API 145A can surface data indicative of a maximum limit associated with a feature (e.g., a maximum number of executions a user can run in an application in a month). In a first-party user facing interface (e.g., plan keys interface 134), the keys value API 145A can obtain the data indicative of maximum limits associated with a feature and transmit the data in a form capable of rendering via a first-party user facing interface. The user device (e.g., user device 110A or user device 130A) can make calls to a keys value API 145A which can make calls to an administrator application (e.g., application 132) or key values dictionary 150B to obtain settings and data associated with the settings (e.g., features, limits, and the like). This can allow for use of this data and metadata in downstream applications. Additionally, or alternatively, the computing system can include an API that communicates data indicative of the actual utilization by users (e.g., organization users 105) and compares that to the limits that are set (e.g., in a keys plan, key values dictionary 150B, and the like). The set limits can be updated in a feedback loop utilizing the data of actual utilization. For instance, the data can be presented to a user (e.g., organization user 105A) via a dashboard inside of an application (e.g., application 112), can be made available to be exported and used in third-party applications to analyze use, or can be automatically streamed to third-party applications.

Content 150C can include one or more content items obtained from organization users 105. For instance, the organization user 105A can provide a plurality of content items (e.g., assets, images, documents, and the like) to the headless CMS computing system 140 via content management API 145B. The headless CMS computing system 140 can be used to design content that will be displayed to third-party users 115 from the organization users 105.

User data 150D can include data associated with first-party users 125, organization users 105, or third-party users 115. Historical data 150E can include data associated with organization users 105.

Feature limit update model 155 can determine one or more feature limits (e.g., lower limits, soft limits, max limits, hard limits, and the like) using the feature utilization data 155A and predicted feature utilization model 155B. For example, the headless CMS computing system 140 can obtain data indicative of feature utilization by one or more organization users 105 associated with an organization. The headless CMS computing system 140 can obtain data from data repository 150 and utilize predicted feature utilization model 155B to predict an expected demand for one or more features (e.g., associated with one or more key values in key values dictionary 150B).

Headless CMS computing system 140 can update one or more key values in key values dictionary 150B based on the output of feature limit update model 155. Feature limit update model 155 or predicted feature utilization model 155B can be machine learned models. The output obtained from feature limit update model 155 or predicted feature utilization model 155B can be used by headless CMS computing system 140 (e.g., via one or more application programming interfaces 145) to update key values (e.g., and associated feature use permissions).

Additionally, or alternatively, headless CMS computing system 140 can allow additional applications or features for products of applications to implement logic based on the settings and associated data. Using key values API 145A, the values of an associated user plan can be obtained from the key values dictionary 150B.

Headless CMS computing system 140 can be used for display of utilization analytics. For instance, keys data and usage data can be compared within an application (e.g., application 112, application 132) via an analytics feature. This can allow for allocating and delivery plan keys for use by an application in terms of settings, keys data, or usage data can be displayed in dashboards or reports indicating the utilization of features by organizations and associated users. This data can be provided for display via an interface of a user device (e.g., user device 110A or user device 120A). In some implementations, this data can be delivered in a visual format such as a message, chart, graph, or raw data.

Example keys for inclusion in the key values dictionary 150B are included within this disclosure for illustrative purposes only. The keys, settings, and features described herein are not inclusive of all keys, settings, or features that could be implemented by a headless CMS. Additionally, or alternatively, in some implementations, a plan keys interface can allow for custom keys to be set for particular organizations to troubleshoot issues or grant access to new features that are in incubation.

Key values dictionary 150B can include data. Data can include metadata. For instance, the key values dictionary 150B can be stored as a key values dictionary file. In some implementations, the key values dictionary file is a TypeScript or JSON file. In some implementations, the key values dictionary file contains a list of default plan keys and associated metadata that can be scaled. Thus, as additional metadata is obtained about features (e.g., utilization costs, new notification types, time limits on settings, and the like), the key values dictionary file associated with key values dictionary 150B can be updated to reflect new data.

Figure 2:
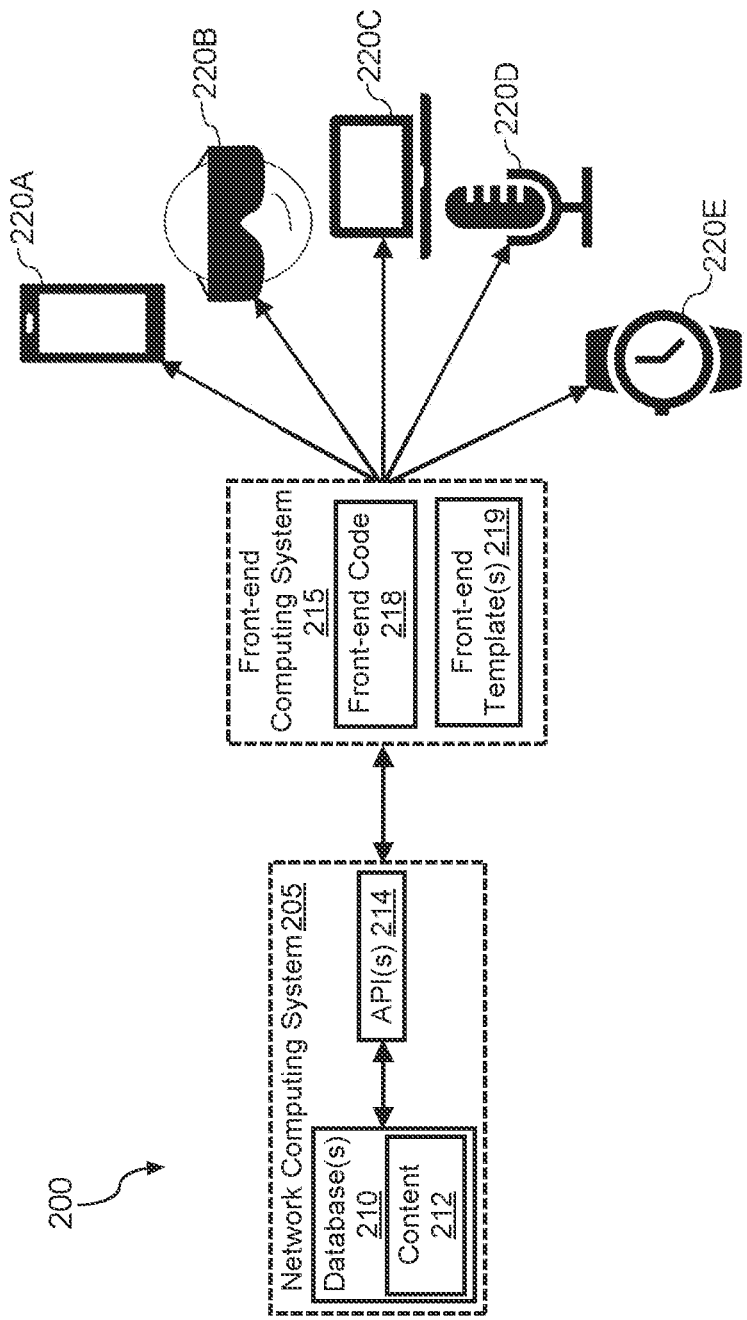
FIG. 2 depicts a block diagram of an example system for facilitating display of content via a headless content management system according to example embodiments of the present disclosure.

The network computing system 135 can include a plurality of potential system architecture designs. FIG. 2 depicts an example system architecture 200 associated with a headless CMS system for facilitating content management and delivery between organization users and third-party users. The architecture can include network computing system 205, front-end computing system 215, and one or more devices 220A-220E.

Network computing system 205 can include database(s) 210 which can include content 212. Content 212 can be content generated or provided by an organization (e.g., organization associated with organization users 105) and stored in database(s) 210. For instance, content can include media files, fields, structures, images, text, video, audio, and the like.

Network computing system 205 can include API(s) 214. API(s) 214 can interface with external computing systems. External computing systems can include front-end computing system 215. Front-end computing system 215 can be a web server or some means for interfacing with the one or more devices 220A-220E. Front-end computing system 215 can include front-end code 218 and front-end templates 219. Front-end code 218 and front-end templates 219 can be used by API(s) 214 to organize content 212 in a manner that can be rendered via a plurality of user devices (e.g., devices 220A-220E). For instance, Front-end template(s) can include a first template associated with providing display via a mobile device (e.g., device 220A), a second template associated with providing display via a virtual reality/augmented reality (VR/AR) device (e.g., device 220B), a third template associated with providing display via a web browser of a computing device (e.g., device 220C), a fourth template associated with providing display via an audio interface of a device (e.g., device 220D), or a fifth template associated with providing display via a wearable device (e.g., device 220E). Devices 220A-220E have been described as particular types of devices for illustrative purposes only and are not meant to limit the disclosure. Devices can additionally include, but are not limited to, mobile devices, computers, laptops, AR/VR headsets, autonomous vehicles, vehicles, autonomous robots, social media applications being utilized on a device, merchant devices, IoT devices (e.g., household appliances), wearables (e.g., smart watch, smart glasses), speakers, tablets, or any other devices that can interface with a headless CMS API.

Organization users can include content providers that can interface with a network computing system associated with the headless CMS service entity to generate, modify, or provide content to be displayed (e.g., published) to end users. The headless CMS service entity can provide for an interface for content providers to interact with to generate and modify content items and can provide a computing system for facilitating serving (e.g., publishing) the content from the content provider to the end user in a format that improves user experience on both the content provider and end-user side.

Organization users can include developers that can interface with a network computing system associated with the headless CMS service entity to create applications, create integrations with IoT devices, develop applications and websites, modify applications and websites, and the like.

In some implementations, the headless CMS service entity can be associated with providing Software as a Service (SaaS) to organization users or other users. In some implementations users can include business users. The organizations can have one or more users associated with the content provider. The one or more users can have designated roles associated with permissions. The permissions can be associated with one or more keys (e.g., features) associated with the headless CMS service. For instance, keys can relate to an ability to adjust content items, add more users, perform API calls, and the like. Tokens can include access tokens, delivery tokens, management tokens, and authtokens. Tokens can be utilized to allow users with tokens to perform certain actions or access certain pages that a user without a token cannot access. For instance, tokens can be associated with the ability to rate limit, create stacks, adjust the number of users, adjust roles of users, and the like.

The present disclosure relates to the provisioning of features associated with the headless CMS system to a plurality of users associated with one or more organizations. The present disclosure relates to methods for providing a bridge between the ability of an administrator of the organization client computing system to adjust certain features associated with non-administrator users and the internal user's (e.g. first-party user) roles in setting, adjusting, or communicating usage limitations and associated messaging.

In some implementations of the present disclosure, resource allocation can be performed for or optimized for a particular subgroup of users associated with a specific organization. Additionally, or alternatively, the present disclosure can provide for resource allocation to optimize overall computing resources based on a global analysis of current user utilization (e.g., by a plurality of users associated with a plurality of organizations).

Figure 3:
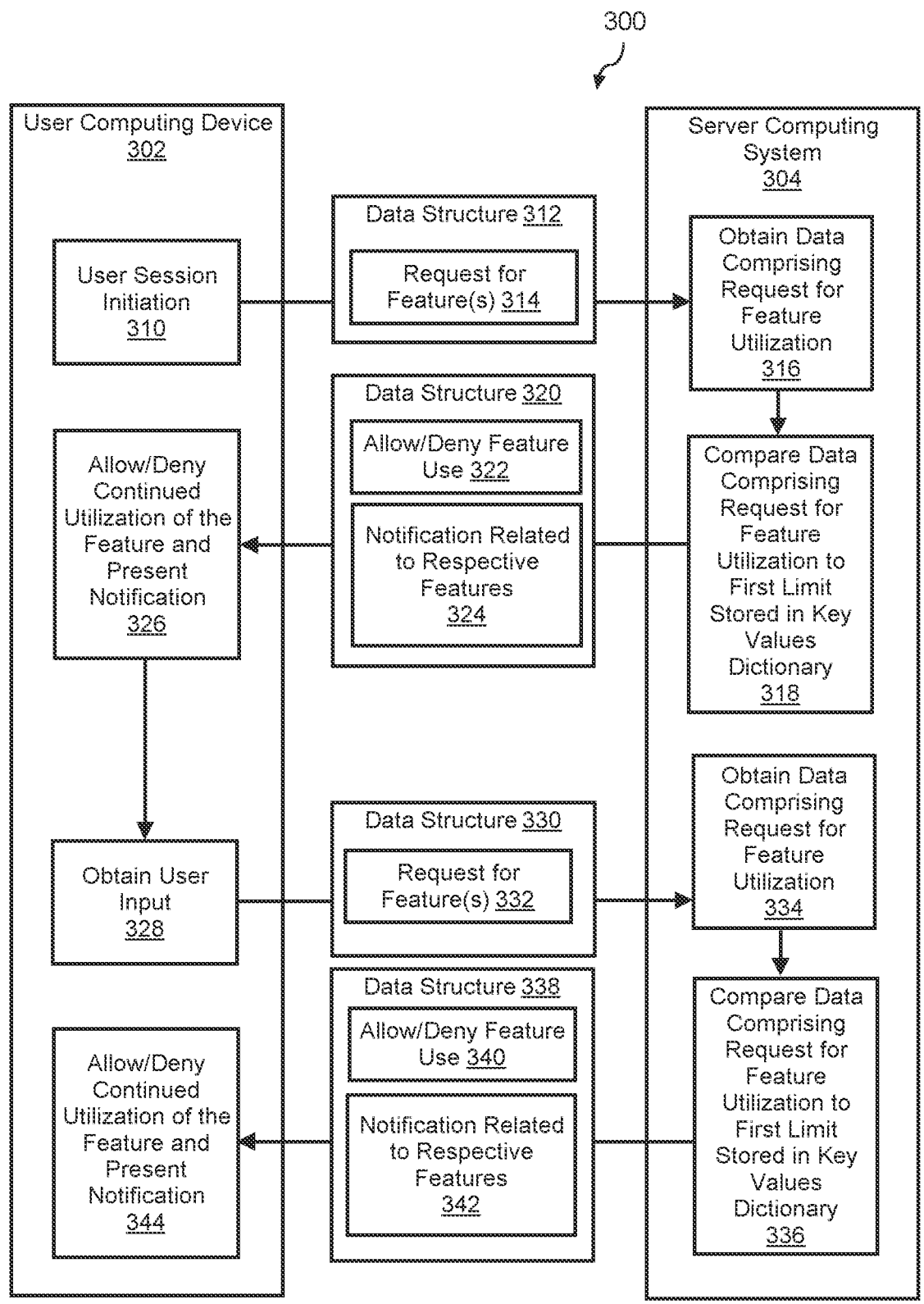
FIG. 3 depicts an example process flow according to example embodiments of the present disclosure.

FIG. 3 depicts an example block diagram depicting an example data flow 300 between a user computing system 302 (e.g. user device 110A associated with organization user 105A) and a server computing system 304 (e.g., network computing system 135). For instance the user computing system 302 can obtain data indicative of user session initiation 310. A user session can be initiated via a user interface of a user device. The user interface can include interactive elements associated with a headless content management service.

User computing device can transmit data structure 312 comprising a request for feature(s) 314 to server computing system 304. Request for feature(s) 314 can be associated with a user's attempt to access a feature or functionality associated with the server computing system 304. For instance, request for feature(s) 314 can be indicative of the user performing a plurality of API calls, utilizing an amount of storage, adding a user to an account, or any other feature described herein.

Server computing system 304 can obtain data comprising the request for feature utilization 316. For instance, the data comprising the request for feature utilization 316 can indicate a first utilization level for the first feature. In response, server computing system 304 can compare data comprising the request for feature utilization to a first limit stored in a key values dictionary 318. For instance, a first limit can be associated with a soft limit. In some instances the key values dictionary can include data associated with a plurality of keys. The data can include at least a user identifier of the key, a first limit, a second limit, and an enabled limit. In some implementations the first limit and the second limit can be numerical values. In some implementations the first and the second limit can be binary settings. Enabled limit can be a selectable user interface element that indicates whether a key limit will be enforced by the computing system or what the enforcement mechanism will be. For instance, the enforcement mechanism can include at least one of a notification about the use, transmitting data of utilization, gathering data of the utilization, or blocking a feature associated with a specific key from being used by a user.

In some implementations the first limit can be a soft limit. A soft limit can be associated with a notification that an upper limit is close to being reached (e.g., as a warning to prevent cutting off access at a point of important utilization by the user (e.g., attempting to load a preview of their content). For instance, in response to determining that the first utilization level is above the first threshold utilization level, the server computing system can transmit data which causes the user device to perform a first-tier action. The first-tier action can include transmitting data which causes a warning message to be provided for display via the user interface of the user device.

Figure 5:
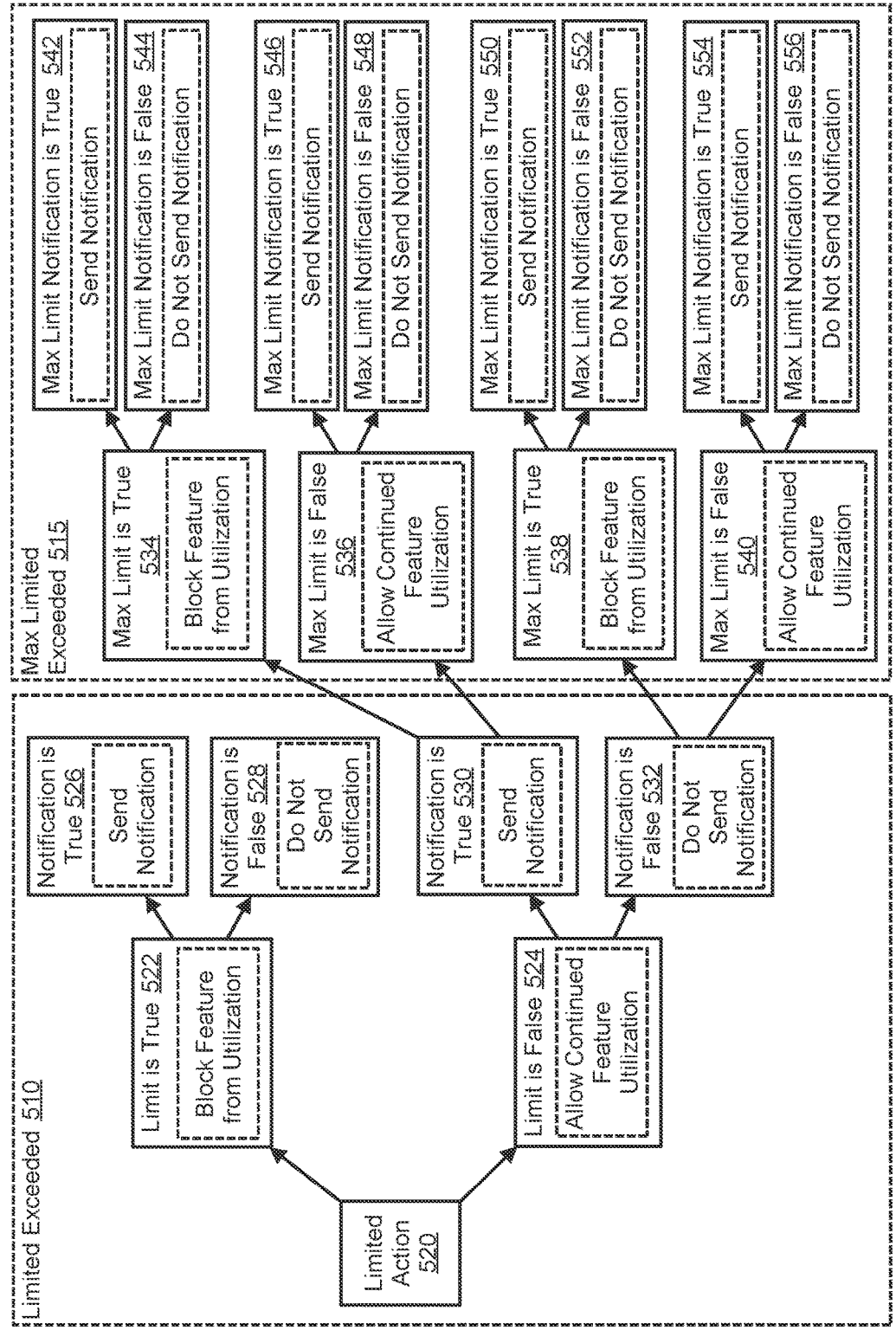
FIG. 5 depicts an example block diagram of a decision tree according to example embodiments of the present disclosure.

Server computing system 304 can transmit data structure 320 to user computing system 302. Data structure 320 can include data indicative of allowing feature use 322 (or in some implementations denying feature use as depicted in FIG. 5) and notification related to respective feature 324. The first limit can be a soft limit. The user computing device can, in response to obtaining data structure 320 update a user interface of user computing system 302 to allow for continued utilization of the feature and present notification 326. By way of example, the first limit can be associated with an API bandwidth usage. In response to determining that request for features 314 is associated with the user utilizing an amount of bandwidth above the first threshold utilization level (e.g., 75% of the allotted API bandwidth usage for the month), a notification can be provided for display via a user interface of user computing system 302. The notification can indicate a message such as "You are nearing your account limit for 75% of the allotted API bandwidth usage for the month. Please be advised that surpassing 100% of the allotted API bandwidth usage for the month will result in access to this feature being blocked. Please reach out to a computing system administrator if you are interested in adjusting your plan and associated feature limits."

User computing system 302 can obtain data indicative of user input 328. User computing system 302 can transmit data structure 330 to server computing system 304. Data structure 330 can include request for feature(s) 332. Server computing system 304 can obtain data comprising a request for feature utilization 334. Server computing system 304 can compare data comprising the request for feature utilization to a second limit stored in the key values dictionary 336.

For instance, a second limit can be associated with a hard limit. In some instances the key values dictionary can include data associated with a plurality of keys. The data can include at least a user identifier of the key, a first limit, a second limit, and an enabled limit. In some implementations the first limit and the second limit can be numerical values. In some implementations the first and the second limit can be binary settings. Enabled limit can be a selectable user interface element that indicates whether a key limit will be enforced by the computing system or what the enforcement mechanism will be. For instance, the enforcement mechanism can include at least one of a notification about the use, transmitting data of utilization, gathering data of the utilization, or blocking a feature associated with a specific key from being used by a user.

In some implementations, the second limit can be a hard limit. A hard limit can cause a feature associated with a specific key to be blocked from being used. For instance, in response to determining that a second utilization level is above the second threshold utilization level, the computing system can transmit data which causes a user device to perform a second-tier action. A second-tier action can be transmitting data which blocks the user device from utilizing the respective feature.

Server computing system 304 can transmit data structure 338 to user computing system 302. Data structure 338 can include an allow or deny feature use 340 or a notification related to respective features 342. The allow or deny feature use 340 can be based at least in part on whether the limit has been enabled (e.g., automatically by a computing system, by a first-party user providing input via a plan keys interface (e.g., plan keys interface 134) to select enabling the feature limit, and the like). If the limit has been enabled, data structure 338 can include data which will cause future utilization of a feature by user computing system 302 to be blocked. Additionally, or alternatively, notification related to respective features 342 can be enabled or disabled (e.g., by a first-party user providing input via a plan keys interface to select enabling a feature limit notification).

The user computing device can, in response to obtaining data structure 338 update a user interface of user computing system 302 to allow for continued utilization or blocking of the feature and present notification 344. By way of example, the second limit can be associated with an allotted API bandwidth usage for a month of 100%. In response to determining that request for allowing feature use 322 is associated with the user executing an excess of 100% of the allotted API bandwidth usage for the month, a notification can be provided for display via a user interface of user computing system 302. The notification can indicate a message such as "You have reached your account limit of API bandwidth usage. Please reach out to a computing system administrator if you are interested in adjusting your plan and associated feature limits."

In some implementations, a second limit can be disabled. In such instances, the user can continue to utilize the respective feature. By way of example, continued use of the feature can be accompanied by a notification comprising a message such as "You have reached your account limit of API bandwidth usage (e.g., per hour, per day, per user). However, due to low overall computing system resource utilization, you have been granted additional API bandwidth to use this month." Or some similar message indicating that the feature can continue to be used even though the user has exceeded their limit (e.g., indicative of the user needing additional API bandwidth, or some other adjustment to their plan).

The enablement or disablement of feature limits can vary by user or user plans. In some instances, customized plans can be generated to be applied to a user or group of users (e.g., associated with an organization, associated with a role). A customized plan can be associated with a plurality of customized key values. The key values can be associated with one or more features that are accessible (or in accessible) to a user based on the respective plan of the user. In some implementations, a user can have a completely unique set of limits and enablement of the limit enforcement. For instance, a user can have a customized plan that is unique to the respective user (e.g., based on an associated service level, subscription level, user organization, user role). In some implementations, a machine learning model can automatically update the key values dictionary or a plan keys interface to adjust the first and second limit to better reflect actual use of a user. In some implementations, the enablement or disablement of enforcement of a limit can be based on an assessment of overall computing resources of the computing system. For instance, in a high use time of day a hard limit can be selected to be enforced. In a low use time of day, a hard limit can be deselected to be enforced (e.g., the blocking of the use of the associated feature can be suspended under certain conditions).

In some implementations, organizations can have customized plans. In some implementations, a customized plan can be recommended to a user or organization (e.g., associated with a plurality of users) based on similarities between the organization and an organization with an existing customized plan. For instance, an organization with 100 employees can be recommended a different customized plan than an organization with 10 employees. Customized plans can be generated or recommended based on an expected utilization of the user(s) associated with a respective organization.

In some embodiments, customized plans can apply to organizations as a whole. Additionally, or alternatively, customized plans can apply to individual users or content objects (e.g., stacks). For instance, an organization with a plurality of users and stacks can be associated with one or more distinct customized plans (e.g., associated with individual users, individual user roles, content objects, or stacks).

Figure 4A:
FIG. 4A-FIG. 4C depict a flowchart of an example method according to example embodiments of the present disclosure.
Figure 4B:
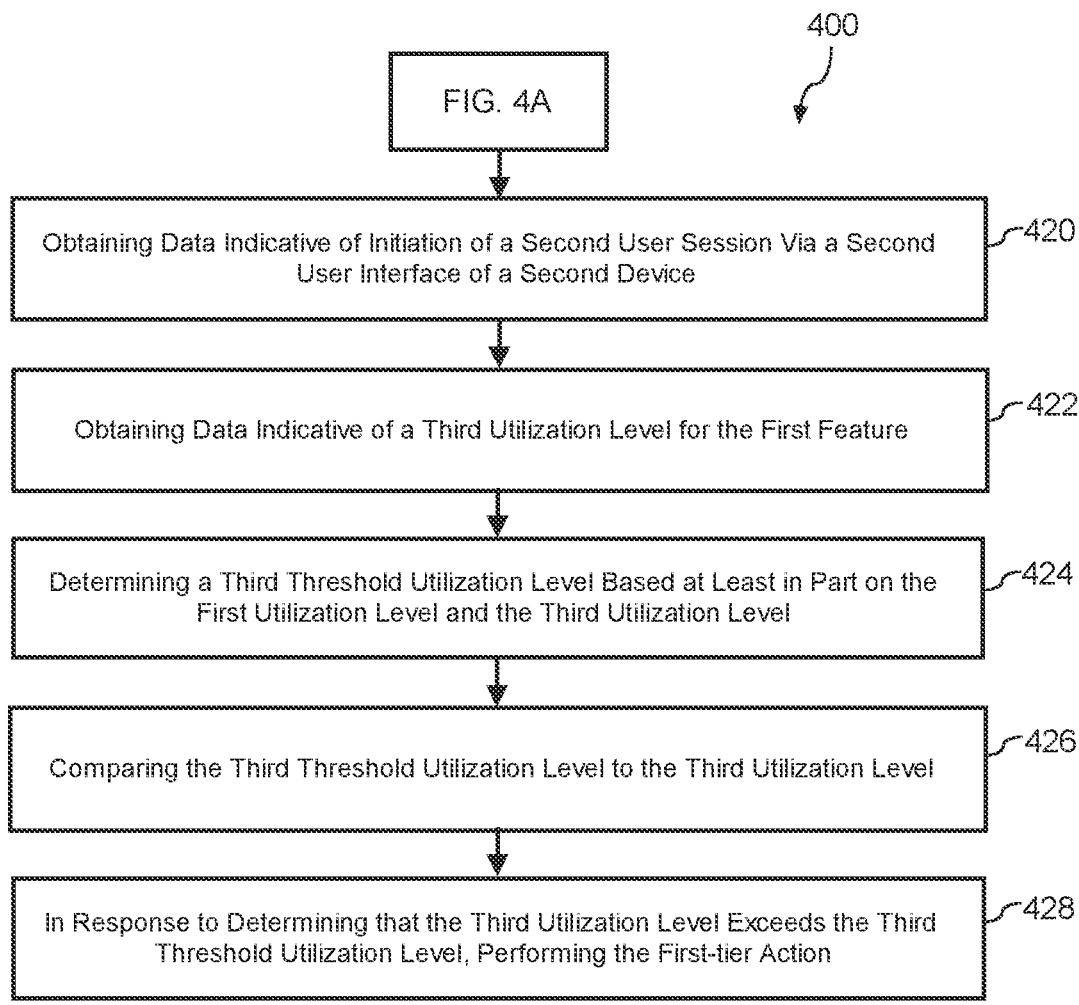
Figure 4C:
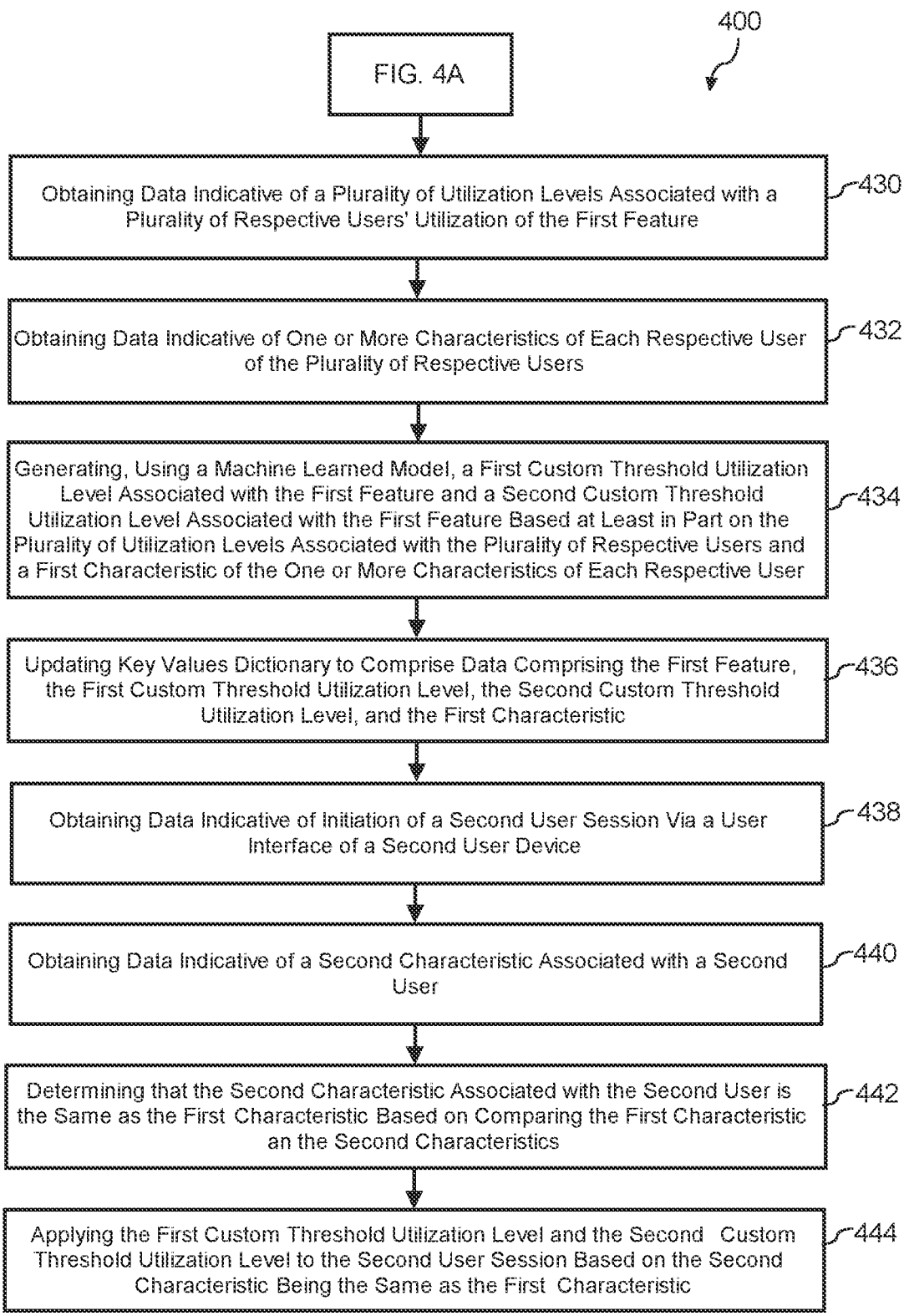

FIG. 4A-FIG. 4C depict a flow chart diagrams of example methods for allocating system resources using dual-limit account provisioning according to example embodiments of the present disclosure. Although FIG. 4A-FIG. 4C depict steps performed in a particular order for purposes of illustration and discussion, the methods of the present disclosure are not limited to the particularly illustrated order or arrangement. The various steps of method 400 can be omitted, rearranged, combined, or adapted in various ways without deviating from the scope of the present disclosure.

At (402), a computing system can maintain a key values dictionary comprising at least a first feature, a first threshold utilization level associated with the first feature, and a second threshold utilization level associated with the first feature. The method can include maintaining a key values dictionary comprising at least a first feature, a first threshold utilization level associated with the first feature, and a second threshold utilization level associated with the first feature. By way of example, the key values dictionary can include a plurality of groups of settings and features.

Key values dictionary can be stored in any format. For instance, an example key for a particular feature can include an identifier (ID), name, group order, and features. The features can include a plurality of features with associated data. The associated data can include, for example, a user identifier (UID), name, key order, configurations, and messages. Configurations can include, for example, required (whether the feature required), enabled (whether the feature is enabled), limit (a first threshold utilization level), max limit (a second threshold utilization level), limit enforced (whether the first threshold utilization level is enforced), max limit enforced (whether the second threshold utilization level is enforced), notify app limit (whether a user associated with an organization is notified when the first threshold utilization level is passed), notify admin limit (whether a first-party user associated with the headless CMS service provider is notified when the first threshold utilization level is passed), notify app max limit (whether a user associated with an organization is notified when the second threshold utilization level is passed), notify admin max limit (whether a first-party user associated with the headless CMS service provider is notified when the second threshold utilization level is passed). Each configuration can have an associated value. For instance, some values can be numerical values (e.g., limits associated with bytes, time, and like) or can be binary (e.g., true or false, 0 or 1) to indicate whether something is enabled or is disabled (e.g., toggled on or off).

Key values dictionary can include messages associated with the respective features. For instance, messages can include limit message (e.g., message transmitted to a user associated with an organization is notified when the first threshold utilization level is passed), max limit message (e.g., message transmitted to a user associated with an organization is notified when the second threshold utilization level is passed), admin limit message (e.g., message transmitted to a first-party user associated with the headless CMS service provider is notified when the first threshold utilization level is passed), admin max limit message (e.g., message transmitted to a first-party user associated with the headless CMS service provider is notified when the second threshold utilization level is passed), app tool tip (e.g., a message presented via an keys interface accessible by a user associated with the organization to explain the feature), or admin tool tip (e.g., a message presented via an keys interface accessible by a first-party user associated with the headless CMS service provider to explain the feature.

The keys in the key values dictionary can be associated with particular features. The features can be grouped. For instance, feature groups can include user settings, organization settings or other settings. Each feature group can include associated features. Each feature can have associated data, which can include an identifier (ID), a name, a key-order, associated configurations, and associated messages. Configurations can include, for example, required, enabled, limit, max limit, limit enforced, max limit enforced, notify app limit, notify app max limit, notify admin limit, or notify admin max limit. Messages can include limit message, max limit message, admin limit message, admin max limit message, app tool tip, admin tool tip. Features for user settings can include, for example, users (number of users), roles (number of different roles) or single sign-on (SSO). Features for organization settings can include, for example, environments (maximum number of environments (e.g., deployment servers, content delivery destinations, and the like)), branches (number of branches allowed per stack), digital properties (number of destinations for content (e.g., website, application, and the like)), API write request limit (maximum number of API write requests per second, API bandwidth (amount of API bandwidth allowed for a respective organization per month (in bytes)), API requests (number of API calls allowed for the organization per month), or max management tokens per stack (number of management tokens that can be generated per stack).

At (404), a computing system can obtain data indicative of initiation of a user session via a user interface of a user device, wherein the user interface comprises interactive elements associated with a headless content management service. The method can include obtaining data indicative of initiation of a user session via a user interface of a user device, wherein the user interface comprises interactive elements associated with a headless content management service. By way of example, a user session can be associated with a user of an organization interacting with an interface of the headless CMS (content management system).

For instance, organization users can include content providers that provide, generate, and publish content in the form of digital experiences. Sessions can include modular content (e.g., users creating and modifying components on a website or application instantly by dragging and dropping items), localization (e.g., creation and publication of entries in a plurality of languages), workflows (e.g., interacting with existing workflows that streamline the flow of content from one stage to another including creation, review, approval, or publication), image editing presents (e.g., building customized presets for image files), live preview (e.g., to live preview entry content across multiple channels before saving or publishing a live website), or comments and discussion (e.g., adding comments in fields in an entry editor to collaborate with other organization users).

Additionally or alternatively, organization users can include developers that build and customize websites and applications. User sessions can include releases (e.g., publishing content in batches), JSON rich text editor (RTE) (e.g., allows addition of different content types that can be edited and formatted without using HTML tags), branches (e.g., allow for experimenting between alternative content options), headless APIs (APIs which allow for headless content management to provide for creation and management of content simultaneously and independently), native SDKs (to allow for pulling content into apps via APIs so that content teams and IT teams can work together to approve and launch applications), or data sync (e.g., an API that syncs headless CMS service entity data associated with an organization with respective applications or websites to ensure the data is up-to-date).

At (406), a computing system can obtain data indicative of a first utilization level for the first feature. The method can include obtaining data indicative of a first utilization level for the first feature. By way of example, a first utilization level can be a numerical value associated with use of a particular feature. As described herein, utilization can be measured in bytes, time, number of instances, and the like.

At (408), a computing system can obtain data associated with the first feature, the data comprising at least the first threshold utilization level and the second threshold utilization level. The method can include obtaining data associated with the first feature, the data comprising at least the first threshold utilization level and the second threshold utilization level. By way of example, a first threshold utilization level can be lower limit or soft limit. As described herein, the second threshold utilization level can include a maximum limit or hard limit. The first threshold utilization level and the second threshold utilization level can be static or can be dynamic. For instance, the threshold utilization levels can be adjusted based on a global allocation of computing resources (e.g., across multiple users across multiple organizations).

For example, the data can be obtained by an application programming interface (API) component. The API component can perform operations. The API component can be a key values API. The operations can include obtaining data indicative of a request for data associated with the first feature. The operations can include obtaining data comprising the first threshold utilization level and the second threshold utilization level. The operations can include transmitting a data structure comprising the first threshold utilization level and the second threshold utilization level to cause the user device to perform the first-tier action.

At (410), a computing system can determine that the first utilization level is above the first threshold utilization level based on comparing the first utilization level to the first threshold utilization level. The method can include determining that the first utilization level is above the first threshold utilization level based on comparing the first utilization level to the first threshold utilization level. As described herein, a first threshold utilization level can be a lower limit or soft limit.

At (412), a computing system can transmit, in response to determining that the first utilization level is above the first threshold utilization level, data which causes the user device to perform a first-tier action. The method can include transmitting, in response to determining that the first utilization level is above the first threshold utilization level, data which causes the user device to perform a first-tier action. By way of example, the first-tier action can include transmitting data which causes a warning message to be provided for display via the user interface of the user device. In some implementations a first-tier action can be associated with altering the users access to a second feature (e.g., auto toggling of a second feature enablement based on a utilization exceeding a threshold utilization associated with a first feature).

By way of example, a first threshold utilization level can be an amount of API bandwidth allowed for a respective organization per month (in bytes). The first threshold utilization level can be set at a value to trigger the performance of a first-tier action. The first-tier action can include, for example, transmitting a notification to an end user about their usage without cutting off usage at a time that would be disruptive of the user's interaction or waste resources by cutting off usage close to the end of processing a request and then having to repeat the request from the start which would result in duplicative/redundant processing and inefficient use of computing resources (e.g., if the limit were manually adjusted or the user waited for the limit to be reset (e.g., next hour, day, month).

At (414), a computing system can obtain data indicative of a second utilization level for the first feature. The method can include obtaining data indicative of a second utilization level for the first feature. By way of example, a second utilization level can be a numerical value associated with use of a particular feature. As described herein, utilization can be measured in bytes, time, number of instances, and the like.

At (416), a computing system can determine that the second utilization level is above the second threshold utilization level based on comparing the second utilization level to the second threshold utilization level. The method can include determining that the second utilization level is above the second threshold utilization level based on comparing the second utilization level to the second threshold utilization level. As described herein, a second threshold utilization level can be a maximum limit or hard limit.

At (418), a computing system can transmit, in response to determining that the second utilization level is above the second threshold utilization level, data which causes the user device to perform second-tier action. The method can include transmitting, in response to determining that the second utilization level is above the second threshold utilization level, data which causes the user device to perform second-tier action. As described herein, the second-tier action can include transmitting data which blocks the user device from utilizing the first feature. In some implementations a second-tier action can be associated with altering the users access to a second feature (e.g., auto toggling of a second feature enablement based on a utilization exceeding a threshold utilization associated with a first feature).

By way of example, a first utilization level can be an amount of API bandwidth allowed for a respective organization per month (in bytes). The second threshold utilization level can be set at a value to trigger the performance of a second-tier action. The second-tier action can include, for example, transmitting a notification to an end user about their usage or blocking usage of a feature. In some implementations, the computing system can determine to send a notification opposed to blocking usage of a feature based on the context of the user's utilization (e.g., user session data, user context data). For instance, the computing system can determine to provide a notification at a time that would be disruptive of the user's interaction or waste resources by cutting off usage close to the end of processing a request and then having to repeat the request from the start which ultimately would result in duplicative/redundant processing and inefficient use of computing resources. Alternatively, the computing system can block utilization of a feature based on the utilization of the user being above the second threshold utilization level to prevent the current user's session from negatively impacting other active user sessions.

In some implementations, the computing system can determine that a frequency of a first utilization level is above a first threshold utilization level. In response to determining that the frequency of the first utilization level being above the first threshold utilization level, updating the first threshold utilization level for the first feature. Thus, based on frequent exceeding of a threshold utilization level, the computing system can automatically update the threshold utilization level for that feature. For instance, this updating can be performed as a feedback loop used in conjunction with one or more machine-learned models. For instance, the machine-learned models can be used to update the lower limit based on a non-linearity of an approach to the max limit. By way of example, a user may get from one to ten uses quickly and then may more slowly get from use eleven to twelve and even more slowly move from use thirteen to fifteen. If the max limit is fifteen and the lower limit is set to ten as a default, the non-linearity in time to reach the max limit may suggest that the lower limit should be adjusted to thirteen to more properly notify the user when they are "close" to reaching the max limit. These numbers are used for illustrative purposes only and similar methods could be applied to any features and associated limits and utilization.

Turning to FIG. 4B, at (420) a computing system can obtain data indicative of an initiation of a second user session via a second user interface of a second device. The method can include obtaining data indicative of an initiation of a second user session via a second user interface of a second device. In some instances, the second user can be associated with the same organization as the first user. In some instances, the second user can be associated with a different organization than the first user.

At (422) a computing system can obtain data indicative of a third utilization level for the first feature. The method can include obtaining data indicative of a third utilization level for the first feature. The third utilization level can be associated with the second user session.

At (424) a computing system can determine a third threshold utilization level based at least in part on the first utilization level and the third utilization level. The method can include determining a third threshold utilization level based at least in part on the first utilization level and the third utilization level. The third threshold utilization level can be set to optimize system resource allocation. For instance, the third threshold utilization level can be set to allow for global optimization of resource allocation opposed to focusing resource allocation on a specific user.

At (426) a computing system can compare the third threshold utilization level to the third utilization level. The method can include comparing the third threshold utilization level to the third utilization level.

At (428) a computing system can, in response to determining that the third utilization level exceeds the third threshold utilization level, perform the first-tier action. The method can include in response to determining that the third utilization level exceeds the third threshold utilization level, performing the first-tier action. For example, the first tier-action can include transmitting a warning notification to the second user device associated with the second user session.

In some implementations, the computing system can generate template plans based on obtained user utilization data. In some implementations, the computing system can update the default key values dictionary limit values based on obtained user utilization data.

Turning to FIG. 4C, at (430) a computing system can obtain data indicative of a plurality of utilization levels associated with a plurality of respective users' utilization of the first feature. The method can include obtaining data indicative of a plurality of utilization levels associated with a plurality of respective users' utilization of the first feature.

At (432) a computing system can obtain data indicative of one or more characteristics of each respective user of the plurality of respective users. The method can include obtaining data indicative of one or more characteristics of each respective user of the plurality of respective users. The characteristics can include at least one of (i) user role, (ii) user permissions, or (iii) user associations. For instance, user role can indicate whether the user is an owner, admin, developer, content manager, or custom role. User permissions can include certain features that a respective user has access to or does not have access to. For instance, an administrator user can have access to more features than a general user (e.g., developer or content manager). User associations can include whether the user is associated with the headless CMS service entity, an organization, or is an unrelated third-party user (e.g., end-user that consumes the content).

At (434) a computing system can generate, using a machine-learned model, a first custom threshold utilization level associated with the first feature and a second custom threshold utilization level associated with the first feature based at least in part on the plurality of utilization levels associated with the plurality of respective users and a first characteristic of the one or more characteristics of each respective users. The method can include generating, using a machine-learned model, a first custom threshold utilization level associated with the first feature and a second custom threshold utilization level associated with the first feature based at least in part on the plurality of utilization levels associated with the plurality of respective users and a first characteristic of the one or more characteristics of each respective users.

At (436) a computing system can update the key values dictionary to include data including the first feature, the first custom threshold utilization level, the second custom threshold utilization level, and the first characteristic. The method can include updating the key values dictionary to include data including the first feature, the first custom threshold utilization level, the second custom threshold utilization level, and the first characteristic. For instance, the data can be associated with a keys plan.

At (438) a computing system can obtain data indicative of initiation of a second user session via a user interface of a second user device. The method can include obtaining data indicative of initiation of a second user session via a user interface of a second user device. The user interface can include interactive elements associated with a headless content management service. For instance, the user interface can be a window of a website or application that the user can interact with to create, modify, or publish content for third-party users to consume.

At (440) a computing system can obtain data indicative of a second characteristic associated with the second user. The method can include obtaining data indicative of a second characteristic associated with the second user. The characteristics can include at least one of (i) user role, (ii) user permissions, or (iii) user associations. For instance, user role can indicate whether the user is an owner, admin, developer, content manager, or custom role. For instance owners and admins can have greater permissions than developer or content managers. User permissions can include certain features that a respective user has access to or does not have access to. For instance, an administrator user can have access to more features than a general user (e.g., developer or content manager). User associations can include whether the user is associated with the headless CMS service entity, an organization, or is an unrelated third-party user (e.g., end-user that consumes the content).

At (442) a computing system can determine that the second characteristic associated with the second user is the same as the first characteristic based on comparing the first characteristic and the second characteristic. The method can include determining that the second characteristic associated with the second user is the same as the first characteristic based on comparing the first characteristic and the second characteristic. For instance, the computing system can determine that the first characteristic is associated with an administrative user role and the second characteristic is associated with an administrative user role.

At (444) a computing system can apply the first custom threshold utilization level and the second custom threshold utilization level to the second user session based on the second characteristic being the same as the first characteristic. The method can include applying the first custom threshold utilization level and the second custom threshold utilization level to the second user session based on the second characteristic being the same as the first characteristic.

By way of example, the first custom threshold utilization level and the second custom threshold utilization level can be associated with a plan for administrative users. The administrative user plan can be saved and applied to future administrative users by determining that the user is an administrative user.

As described herein, the computing system can determine when to perform actions associated with first threshold utilization values (e.g., lower limit or soft limits), and second threshold utilization values (e.g., max limits or hard limits). An example decision tree for determining when to perform first-tier actions and second tier-actions is depicted in FIG. 5. Decision tree 500 can include limit exceeded 510 and max limit exceeded 515 decision boundaries. Limit exceeded 510 decision boundary can be associated with a lower limit or soft limit being exceeded (e.g., a first threshold utilization level being exceeded). Max limit exceeded 515 decision boundary can be associated with a maximum limit or hard limit being exceeded (e.g., a second threshold utilization level being exceeded). For instance, at nodes limited action 520 the computing system can determine if the action (e.g., feature) is limited. If the action is limited, the computing system can block a feature from utilization at limit is true 522 node. The computing system can determine that the limit has not been reached at limit is false 524 node and allow continued feature utilization.

At nodes limit is true 522 and limit is false 524, the computing system can determine if notification is true or false. At node notification is true 526 node and notification is true 530 node, the computing system can send a notification. At node notification is false 528 node and notification are false 532 node, the computing system will not send a notification. For instance, the notification can indicate whether the limit was exceeded or not exceeded.

At nodes notification is true 530 node and notification is false 532 node, the computing system can determine if the max limit has been exceeded. At nodes max limit is true 534 node and max limit is true 538 node, the computing system can determine that the limit has been exceeded and block a feature from utilization. At nodes max limit is false 536 node and max limit is false 540 node, the computing system can determine that the limit has not been exceeded and allow continued feature utilization.

At nodes max limit is true 534 node, max limit is false 536 node, max limit is true 538 node, or max limit is false 540 node, the computing system can determine if max limit notification is true or false. At nodes max limit notification is true 542 node, max limit notification is true 546 node, max limit notification is true 550 node, or max limit notification is true 554 node the computing system can send a notification indicating whether the max limit has been exceeded. At node max limit notification is false 544 node, max limit notification is false 548 node, max limit notification is false 552 node, or max limit notification is false 556 node the computing system will not send a notification. For instance, the notification can indicate whether the max limit was exceeded or not exceeded.

FIG. 6 to FIG. 8B depict example user interfaces associated with a plan keys interface according to embodiments of the present disclosure.

Figure 6:
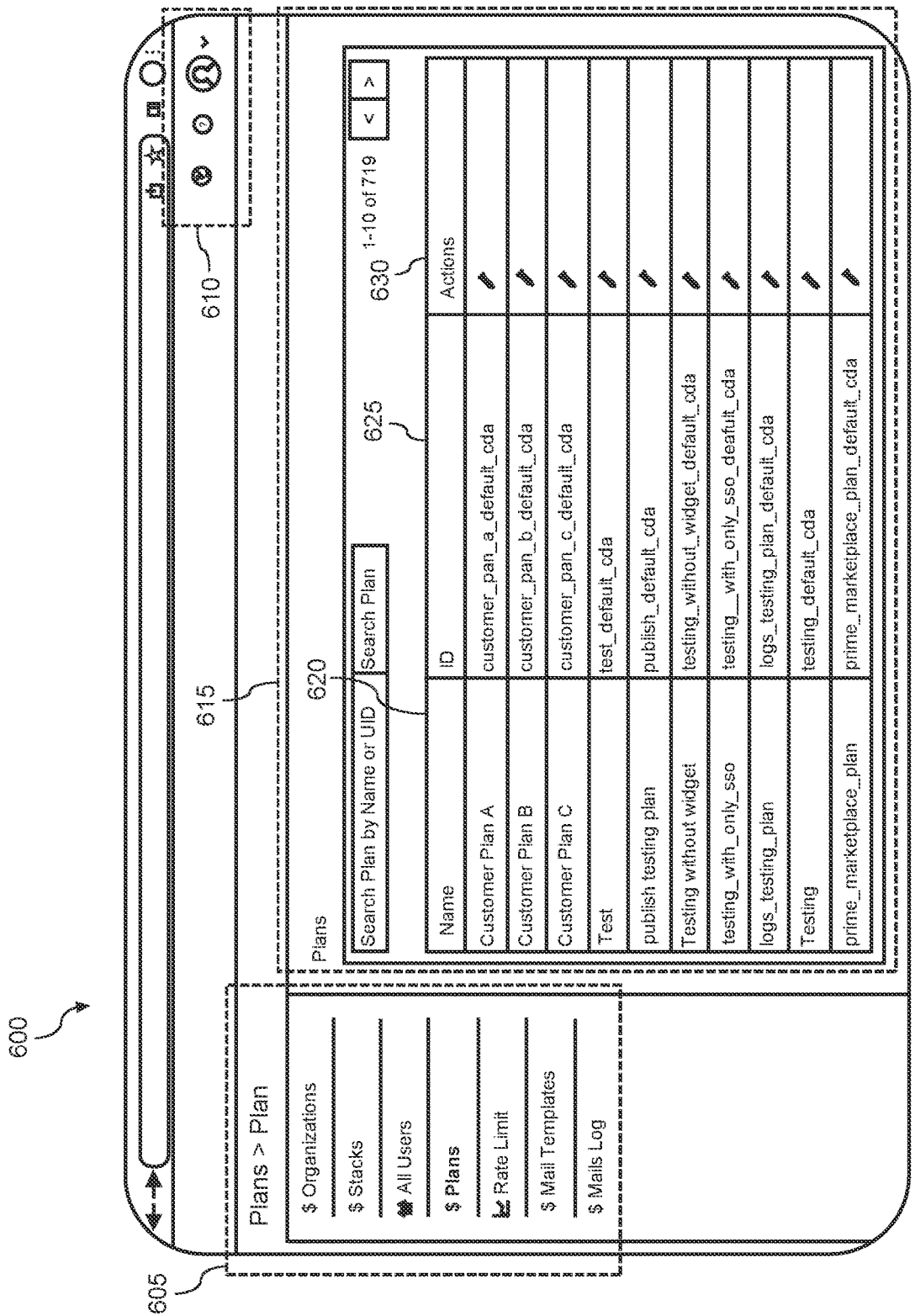
FIG. 6 depicts an example user interface according to example embodiments of the present disclosure.

FIG. 6 depicts an example user interface 600. Example user interface 600 can include menu components 605, user account component 610, and plans component 615. Plans component 615 can include data associated with a plurality of plans. For instance, data can include name 620, identifier (ID) 625, and actions 630. A name can be a name of a plan. A plan can be associated with specific settings (e.g., limits, utilization levels) set for specific features. As described within, settings for specific features can be set via a plan keys interface, plans can be generated, plans can be saved, plans can be edited, plans can be stored, and plans can be deleted. Actions can include, for instance, add new plan, edit existing plan, delete plan, copy plan, and the like.

Figure 7:
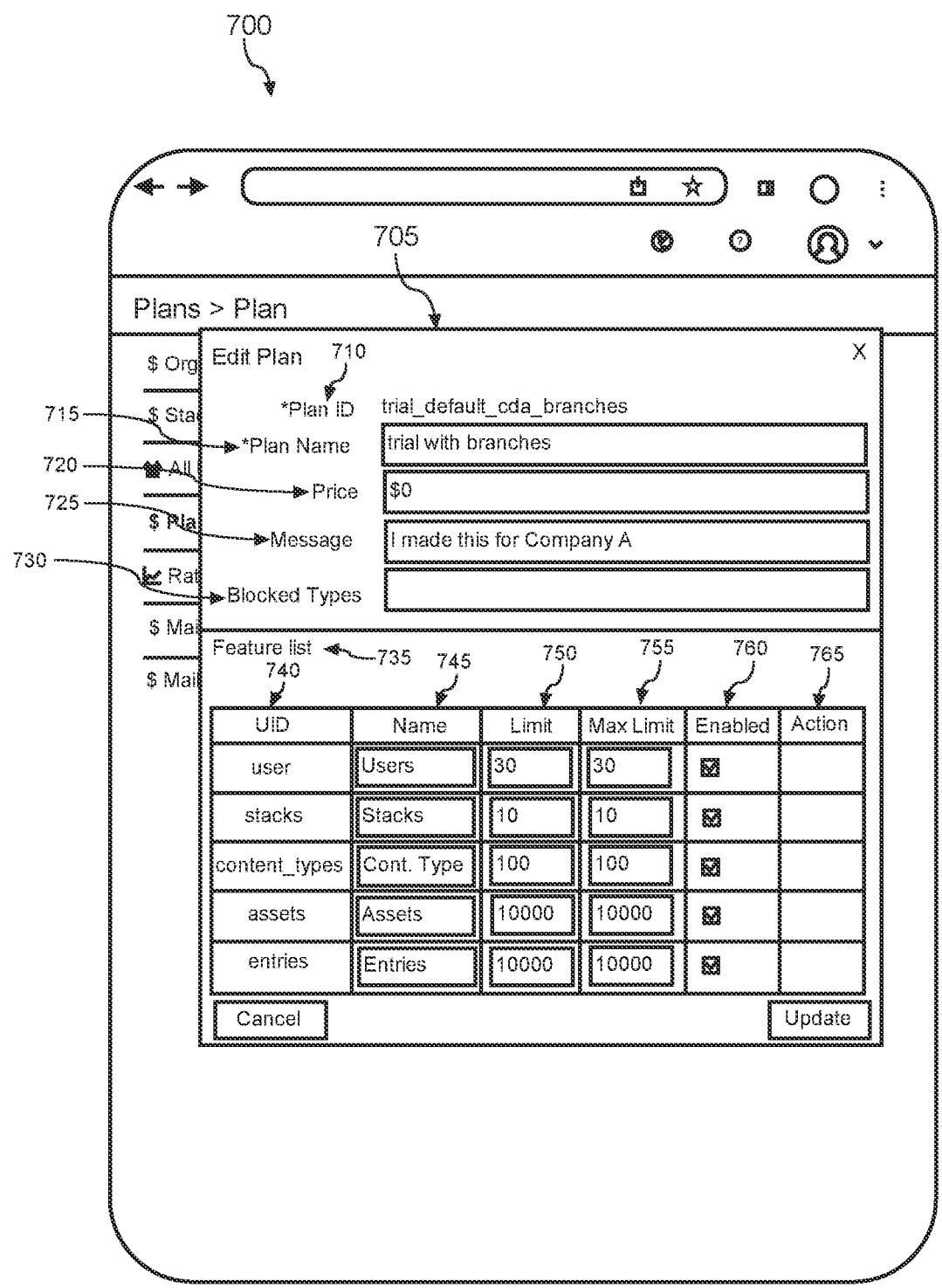
FIG. 7 depicts an example user interface according to example embodiments of the present disclosure.

FIG. 7 depicts an example user interface 700. Example user interface 700 can be associated with editing an existing plan. For instance, example user interface 700 can include an edit plan interface 705. Edit plan interface 705 can include a plurality of fields. By way of example, the fields can include plan ID 710, plan name 715, price 720, message 725, and blocked asset types 730. Additionally, or alternatively, edit plan interface 705 can include feature list 735. As depicted in FIG. 7, in some implementations, feature list 735 can be in a table format. Feature list 735 can include a plurality of columns. The plurality of columns can include user identification (UID) 740, name 745, limit 750, max limit 755, enabled 760, and action 765. The features list can be scrollable and include a plurality of features not depicted in FIG. 7.

FIG. 8A and FIG. 8B depict portions of an example user interface 800. Example user interface 800 can be associated with creating a new plan. As depicted in FIG. 8A, example user interface 800 can include a create plan title 805. The user interface 800 can include a plurality of input fields. For example, the fields can include plan ID 810, save plan as a template selectable element 815, plan name 820, price 825, message 830, blocked asset types 835, and select template 840.

User interface 800 can include a plurality of settings. The settings can include user administrative settings 845 as depicted in FIG. 8A. As depicted in FIG. 8B, the settings can include organization settings 850 and stack settings 855. The types of settings described with respect to user interface 800 are used for illustrative purposes only and are not meant to limit the disclosure. Settings can include core features, business capabilities, extensibility, security, development capabilities, support, and the like. Within each setting category are specific features associated with the setting category. Specific features can include, for example, users, bandwidth, storage, API calls, languages/locales, stacks, branches, content types, content entries, roles, and the like.

Figure 9:
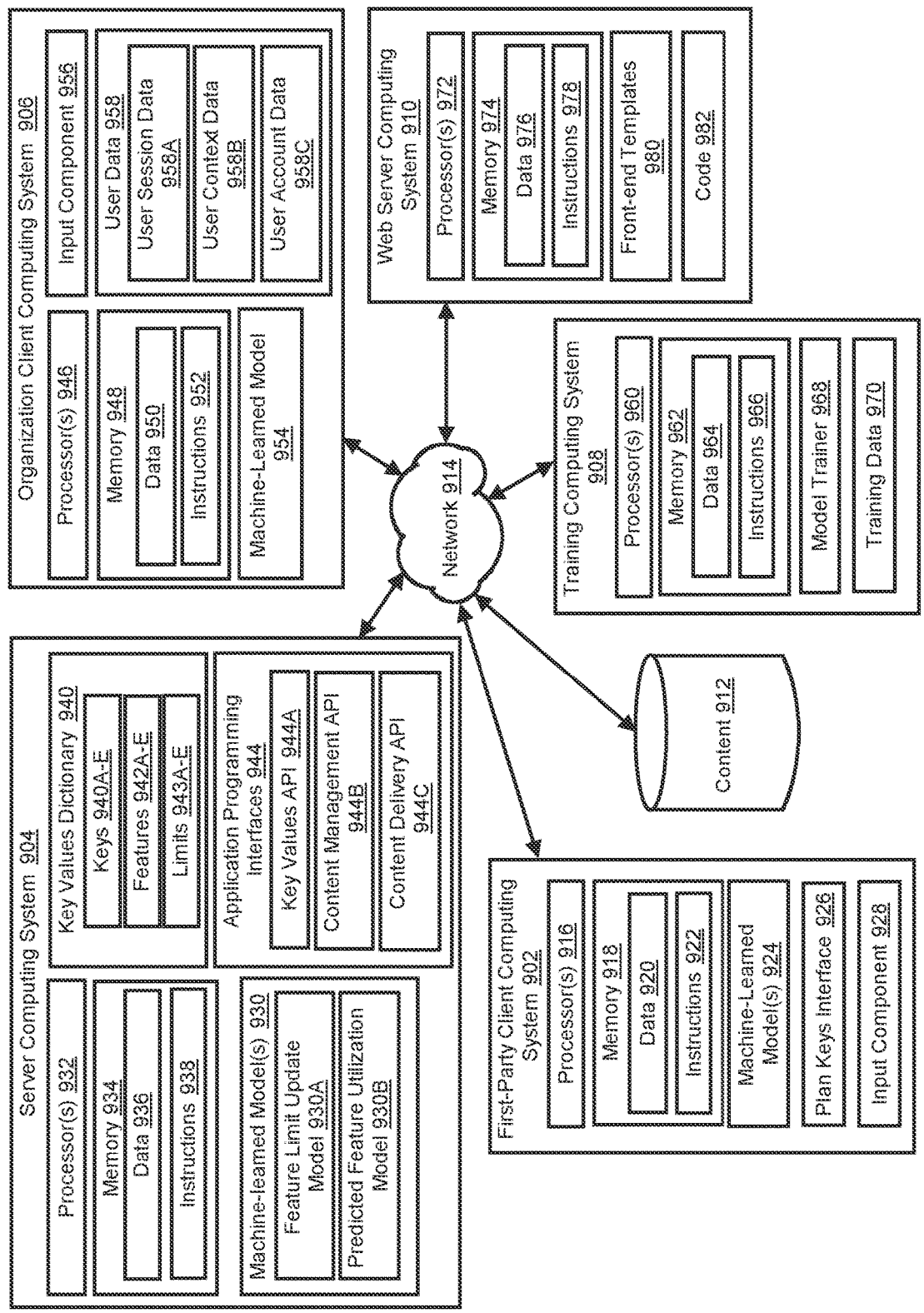
FIG. 9 depicts a block diagram of an example system for allocating system resources using dual-limit account provisioning according to example embodiments of the present disclosure.

FIG. 9 depicts a block diagram of an example computing system 900 that allocates system resources using dual-limit account provisioning according to example embodiments of the present disclosure. The computing system 900 includes a first-party client computing system 902, a server computing system 904, an organization client computing system 906, a training computing system 908, a web server computing system 910, and content database 912 that are communicatively coupled over a network 914.

The first party client computing system 902 can include one or more computing devices. Computing devices can include any type of computing device, such as, for example, a personal computing device (e.g., laptop or desktop), a mobile computing device (e.g., smartphone or tablet), a wearable computing device, an embedded computing device, or any other type of computing device.

The one or more devices associated with first party client computing system 902 include one or more processors 916 and a memory 918. The one or more processors 916 can be any suitable processing device (e.g., a processor core, a microprocessor, an ASIC, an FPGA, a controller, a microcontroller, etc.) and can be one processor or a plurality of processors that are operatively connected. The memory 918 can include one or more computer-readable storage media which may be non-transitory, such as RAM, ROM, EEPROM, EPROM, flash memory devices, magnetic disks, etc., and combinations thereof. The memory 918 can store data 920 and instructions 922 which are executed by the processor 916 to cause the first party client computing system 902 to perform operations.

In some implementations, the first party client computing system 902 can store or include one or more machine-learned models 924. For example, the machine-learned models 924 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 924 are discussed with reference to FIG. 1 (e.g., feature limit update model 155 or predicted feature utilization model 155B.

In some implementations, the one or more machine-learned models 924 can be received from the server computing system 904 over network 914, stored in the user computing device memory 918, and then used or otherwise implemented by the one or more processors 946. In some implementations, the first party client computing system 902 can implement multiple parallel instances of a single machine-learned model 924 (e.g., to perform parallel updating of key values dictionary).

More particularly, the machine learned model can obtain data indicative of user input. The user data can be associated with a current user session or include historical user data (e.g., historical data 150E). For example, data associated with a current user session can be data obtained in real-time via an input component 928. In some implementations, the data is associated with input received from the user via the plan keys interface 926. User data can include data associated with setting key values or creating key plans.

Historical user data can include data associated with a user account, user characteristics, etc. Historical user data can include data associated with a user device (e.g., device identifier). In addition, or alternatively, historical user data can include data associated with a user identifier. In some embodiments, historical user data can include aggregate data associated with a plurality of user identifiers. In some embodiments, the training data 970 can include session data (e.g., of one or more input sessions) associated with one or more input devices, such as session data indexed over a type of input interface or device (e.g., mobile device with touchscreen, mobile device with keyboard, large touchscreen, small touchscreen, large touchscreen, voice inputs, or combinations thereof, etc.). In some embodiments, the training data 970 can include session data not associated with user identifiers. Using the machine-learned model, the computing system can determine one or more recommended limits to provide as output from the machine-learned model. The computing system can update the key values dictionary (or specific key plans) based on the output from the machine-learned model.

Additionally, or alternatively, one or more machine-learned models 924 can be included in or otherwise stored and implemented by the server computing system 904 that communicates with the first party client computing system 902 according to a client-server relationship. For example, the machine-learned models 924 can be implemented by the server computing system 904 as a portion of a web service (e.g., a content development service). Thus, one or more models 924 can be stored and implemented at the first party client computing system 902 or one or more models 924 can be stored and implemented at the server computing system 904.

The first party client computing system 902 can also include one or more user input components 928 that can receive user input. For example, the user input component 928 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 904 includes one or more processors 932 and a memory 934. The one or more processors 932 can be any suitable processing device (e.g., a processor core, a microprocessor, an ASIC, an FPGA, a controller, a microcontroller, etc.) and can be one processor or a plurality of processors that are operatively connected. The memory 934 can include one or more computer-readable storage media which may be non-transitory, such as RAM, ROM, EEPROM, EPROM, flash memory devices, magnetic disks, etc., and combinations thereof. The memory 934 can store data 936 and instructions 938 which are executed by the processor 932 to cause the server computing system 904 to perform operations.

In some implementations, the server computing system 904 includes or is otherwise implemented by one or more server computing devices. In instances in which the server computing system 904 includes plural server computing devices, such server computing devices can operate according to sequential computing architectures, parallel computing architectures, or some combination thereof.

The server computing system 904 can include a key values dictionary 940. Key values dictionary can include keys 940A-940E. Keys 940A-940E can be associated with respective features 942A-942E as described herein. Keys can be different settings. Settings can include limits 943A-943E.

The server computing system 904 can include one or more APIs. APIs can include key values API 944A, content management API 944B, or content delivery API 944C. Key values API 944A can be utilized to interface with first-party client computing system 902 or organization client computing system 906. For instance, key values API can be a middleware API that reads data from the key values dictionary (or any other relevant datastore) and surfaces the data within an application (e.g., keys interface). For instance, in an organization user facing interface, the keys value API can surface data indicative of a maximum limit associated with a feature (e.g., a maximum number of executions a user can run in an application in a month). The user device can make calls to a key values API which can make calls to an administrator application to obtain settings and data associated with the settings (e.g., features, limits, and the like). This can allow for use of this data and metadata in downstream applications.

Additionally, or alternatively, the computing system can include an API that communicates data indicative of the actual utilization by users and compare that to the limits that are set (e.g., in a keys plan, key values dictionary, and the like). The set limits can be updated in a feedback loop utilizing the data of actual utilization. For instance, the data can be presented to a user via a dashboard inside of an application, can be made available to be exported and used in third-party applications to analyze use, or could be automatically streamed to third-party applications.

Server computing system 904 can interface with the one or more user devices (e.g., user devices associated with first-party client computing system 902, organization client computing system 906, or web server computing system 910) associated with one or more users (e.g., organization users 105, third-party users 115, or first-party users 125) using one or more application programming interfaces 944. For instance, first-party user devices (e.g., user device associated with first-party client computing system 902) can interface with server computing system 904 via key values API 944A. For instance, organization user devices (e.g., user device associated with organization client computing system 906) can interface with server computing system 904 via content management API 944B. For instance, third-party user devices (e.g., user device associated with web server computing system 910) can interface with server computing system 904 via content delivery API 944C.

As described above, the server computing system 904 can store or otherwise include one or more machine-learned models 930. For example, the models 930 can be or can otherwise include various machine-learned models. For instance, machine-learned models 930 can include feature limit update model 930A or predicted feature utilization model 930B. Feature limit update model 930A can determine one or more feature limits (e.g., lower limits, soft limits, max limits, hard limits, and the like) using the feature utilization data and predicted feature utilization model 930B. For example, the server computing system 904 can obtain data indicative of feature utilization by one or more organization users associated with organization client computing system 906. The server computing system 904 can obtain data from a data repository and utilize predicted feature utilization model 930B to predict an expected demand for one or more features (e.g., associated with one or more key values in key values dictionary 940).

Server computing system 904 can update one or more key values in key values dictionary 940 based on the output of feature limit update model 930A. Feature limit update model 930A or predicted feature utilization model 930B can be machine learned models. The output obtained from feature limit update model 930A or predicted feature utilization model 930B can be used by server computing system 904 (e.g., via one or more application programming interfaces 944) to update key values (e.g., and associated feature use permissions).

Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 930 are discussed herein.

The first party client computing system 902, organization client computing system 906, or the server computing system 904 can train the models 924, 930, or 954 via interaction with the training computing system 908 that is communicatively coupled over the network 914. The training computing system 908 can be separate from the server computing system 904 or can be a portion of the server computing system 904.

The organization client computing system 906 can include one or more computing devices. Computing devices can include any type of computing device, such as, for example, a personal computing device (e.g., laptop or desktop), a mobile computing device (e.g., smartphone or tablet), a wearable computing device, an embedded computing device, or any other type of computing device. Devices can additionally include, but are not limited to, mobile devices, computers, laptops, AR/VR headsets, autonomous vehicles, vehicles, autonomous robots, social media applications being utilized on a device, merchant devices, IoT devices (e.g., household appliances), wearables (e.g., smart watch, smart glasses), speakers, tablets, or any other devices that can interface with a headless CMS API.

The one or more devices associated with organization client computing system 906 include one or more processors 946 and a memory 948. The one or more processors 946 can be any suitable processing device (e.g., a processor core, a microprocessor, an ASIC, an FPGA, a controller, a microcontroller, etc.) and can be one processor or a plurality of processors that are operatively connected. The memory 948 can include one or more computer-readable storage media which may be non-transitory, such as RAM, ROM, EEPROM, EPROM, flash memory devices, magnetic disks, etc., and combinations thereof. The memory 948 can store data 950 and instructions 952 which are executed by the processor 946 to cause the organization client computing system 906 to perform operations.

In some implementations, the organization client computing system 906 can store or include one or more machine-learned models 954. For example, the machine-learned models 954 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 954 are discussed herein.

In some implementations, the one or more machine-learned models 954 can be received from the server computing system 904 over network 914, memory 948 (e.g., stored in a user computing device memory associated with organization client computing system 906), and then used or otherwise implemented by the one or more processors 946. In some implementations, the organization client computing system 906 can implement multiple parallel instances of a single machine-learned model 954 (e.g., to perform parallel updating of key values dictionary).

More particularly, the machine learned model can obtain data indicative of user input. The user input data can be associated with a current user session or include historical user data. For example, data associated with a current user session can be data obtained in real-time via an input component 956. User data 958 can include user session data 958A, user context data 958B, and user account data 958C.

The organization client computing system 906 can include user data 958. User data 958 can include user session data 958A, user context data 958B, or user account data 958C. User session data 958A can include data obtained via input component 956 indicative of a current user session. For example, user session data 958A can include a request for access to a particular feature, or data indicative of a utilization amount of a particular feature received within a threshold time of the current session. For example, a user can submit a first request and five minutes later submit a second request. The proximity of the first request and second request in time can be context data 958B. The computing system can use context data 958B when processing user requests to determine whether a utilization limit has been reached, whether to perform an action based on the utilization limit being reached, and whether to transmit a notification based on the utilization limit being reached.

The user input can be used by organization client computing system 906 to send a request to server computing system 904 to utilize one or more features (e.g., of the headless content management system to generate, compile, or publish content). The computing system can compare the utilization of a feature of the user session to a first limit and a second limit. Based on the comparison, the computing system can perform various actions. The actions can include blocking use of features, allowing use of features, providing notifications about the use, and updating limit values based on the use (e.g., using one or more machine-learned models). User context data 958B can include context of prior sessions or historical session data. User context data can include a time, device used, additional related devices with active sessions, and the like. User account data 958C can include data associated with a user account (e.g., login, device identifier, user identifier, user role, user permissions).

In some implementations, user data 958 can be used as input for one or more machine-learned models 924, 930, or 954. User data 958 can include data associated with a user account, user characteristics, and the like. User data 958 can include data associated with a user device (e.g., device identifier). In addition, or alternatively, user data can include data associated with a user identifier. In some embodiments, user data can include aggregate data associated with a plurality of user identifiers (e.g., a group of users associated with an organization). In some embodiments, the user session data 958A can include data indicative of one or more input sessions associated with an input component 956 of a device. In some embodiments, data in a database associated with user data 958 can be used as training data 970. Using the machine-learned model 954, the computing system can determine a predicted feature utilization or a recommended feature limit. The computing system can perform an action based on the predicted feature utilization or recommended feature limit.

Additionally, or alternatively, one or more machine-learned models 954 can be included in or otherwise stored and implemented by the server computing system 904 that communicates with the organization client computing system 906 according to a client-server relationship. For example, the machine-learned models 954 can be implemented by the server computing system 904 as a portion of a web service (e.g., a content development service, a campaign management service, a content strategy management service). Thus, one or more models 954 can be stored and implemented at the organization client computing system 906 or one or more models 954 can be stored and implemented at the server computing system 904.

The organization client computing system 906 can also include one or more user input components 956 that can receive user input. For example, the user input component 956 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The training computing system 908 includes one or more processors 960 and a memory 962. The one or more processors 152 can be any suitable processing device (e.g., a processor core, a microprocessor, an ASIC, an FPGA, a controller, a microcontroller, etc.) and can be one processor or a plurality of processors that are operatively connected. The memory 962 can include one or more computer-readable storage media which may be non-transitory, such as RAM, ROM, EEPROM, EPROM, flash memory devices, magnetic disks, etc., and combinations thereof. The memory 962 can store data 964 and instructions 966 which are executed by the processor 960 to cause the training computing system 908 to perform operations. In some implementations, the training computing system 908 includes or is otherwise implemented by one or more server computing devices associated with server computing system 904.

The training computing system 908 can include a model trainer 968 that trains the machine-learned models 924, 930, or 954 stored at the first party client computing system 902, organization client computing system 906, or the server computing system 904 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, or various other loss functions. Gradient descent techniques can be used to iteratively update the parameters over a number of training iterations.

In some implementations, performing backwards propagation of errors can include performing truncated back-propagation through time. The model trainer 968 can perform a number of generalization techniques (e.g., weight decays, dropouts, etc.) to improve the generalization capability of the models being trained.

In particular, the model trainer 968 can train the machine-learned models 924, 930, or 954 based on a set of training data 970. The training data 970 can include, for example, user feature utilization data or user session data 958A.

In some embodiments, the machine-learned models 924, 930, or 954 can be trained using reinforcement learning. For example, a training dataset comprising actual user utilization data can be used to train a machine-learned model used to update the key values dictionary 940. In response to obtaining user data, the computing system can determine updated limits 943A-943E associated with features 942A-942E. The computing system can learn appropriate weights based on receiving a reward for suggested key limit updates that result in positive user feedback or less exceeding of threshold utilization levels or other data indicative of a correlation between an output of the respective model. The training data 970 and user data 958 (e.g., user session data 958A, user context data 958B, or user account data 958C) can be used by a model trainer 968 to train any of machine-learned models 924, 930, or 954.

In some implementations, the computing system can train one or more machine-learned models of the machine-learned models 924, 930, or 954 through the use of one or more model trainers and training data. The model trainer(s) can train any one of the model(s) using one or more training or learning algorithms. One example training technique is backwards propagation of errors. In some implementations, the model trainer(s) can perform supervised training techniques using labeled training data. In other implementations, the model trainer(s) can perform unsupervised training techniques using unlabeled training data. In some implementations, the training data can include simulated training data (e.g., training data obtained from simulated scenarios, inputs, configurations, environments). In some implementations, the computing system can implement simulations for obtaining the training data or for implementing the model trainer(s) for training or testing the model(s). By way of example, the model trainer(s) can train one or more components of a machine-learned model to generate recommended limits using unsupervised training techniques using an objective function (e.g., costs, rewards, heuristics, constraints, etc.). In some implementations, the model trainer(s) can perform a number of generalization techniques to improve the generalization capability of the model(s) being trained. Generalization techniques include weight decays, dropouts, or other techniques.

The trained model(s) can be used to update feature limits and predict suggested feature limits which can in turn be used to update key values dictionary 940 which can be used by Key values API 944A to serve notifications and block future utilization based on users exceeded threshold utilization levels.

In some implementations, if the user has provided consent, the training examples can be provided by the organization client computing system 906. Thus, in such implementations, the model 954 provided to the organization client computing system 906 can be trained by the training computing system 908 on user-specific data received from the organization client computing system 906. In some instances, this process can be referred to as personalizing the model.

The model trainer 968 includes computer logic utilized to provide desired functionality. The model trainer 968 can be implemented in hardware, firmware, or software controlling a general-purpose processor. For example, in some implementations, the model trainer 968 includes program files stored on a storage device, loaded into a memory and executed by one or more processors. In other implementations, the model trainer 968 includes one or more sets of computer-executable instructions that are stored in a tangible computer-readable storage medium such as RAM, hard disk, or optical or magnetic media.

The network 914 can be any type of communications network, such as a local area network (e.g., intranet), wide area network (e.g., Internet), or some combination thereof and can include any number of wired or wireless links. In general, communication over the network 914 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

The machine-learned models described in this specification may be used in a variety of tasks, applications, or use cases.

In some implementations, the machine-learned models can be deployed on-device. For example, one or more components of a predictive machine-learned model or pipeline can be deployed on-device to avoid the upload of potentially sensitive information relating to the types of input, the types of device(s), or the contents of the inputs (e.g., relating to disabilities, contact information, address, etc.) to a server. For example, the server computing system can send a form with a learned context vector describing one or more input fields associated with a component (e.g., portion of an application associated with performance of a processing task). An onboard client model associated with the first party client computing system 902 or organization client computing system 906 can input local client characteristics (e.g., obtained via the user input component 928 or 956) and a context vector to generate a composed modular application. This on device processing can increase data privacy for a user. In some embodiments, this can also reduce the amount of data transmitted off-device, thereby reducing bandwidth usage.

The web server computing system 910 can include one or more computing devices. Computing devices can include any type of computing device, such as, for example, a personal computing device (e.g., laptop or desktop), a mobile computing device (e.g., smartphone or tablet), a wearable computing device, an embedded computing device, or any other type of computing device. Computing devices associated with web server computing system 910 can be third-party devices associated with end users or consumers of the content generated, managed, and published by a headless content management system (e.g., associated with server computing system 904). Devices can additionally include, but are not limited to, mobile devices, computers, laptops, AR/VR headsets, autonomous vehicles, vehicles, autonomous robots, social media applications being utilized on a device, merchant devices, IoT devices (e.g., household appliances), wearables (e.g., smart watch, smart glasses), speakers, tablets, or any other devices that can interface with a headless CMS API.

The one or more devices associated with web server computing system 910 include one or more processors 972 and a memory 974. The one or more processors 972 can be any suitable processing device (e.g., a processor core, a microprocessor, an ASIC, an FPGA, a controller, a microcontroller, etc.) and can be one processor or a plurality of processors that are operatively connected. The memory 974 can include one or more computer-readable storage media which may be non-transitory, such as RAM, ROM, EEPROM, EPROM, flash memory devices, magnetic disks, etc., and combinations thereof. The memory 974 can store data 976 and instructions 978 which are executed by the processor 972 to cause the web server computing system 910 to perform operations.

The operations can include executing one or more frontend templates 980 or code 982 to provide content items to devices associated with end users (e.g., consumers). The content items can be generated by obtaining content from content database 912 (e.g., associated with server computing system) over network 914.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted or described steps are merely illustrative and can be omitted, combined, or performed in an order other than that depicted or described; the numbering of depicted steps is merely for ease of reference and does not imply any particular ordering is necessary or preferred.

The functions or steps described herein can be embodied in computer-usable data or computer-executable instructions, executed by one or more computers or other devices to perform one or more functions described herein. Generally, such data or instructions include routines, programs, objects, components, data structures, or the like that perform tasks or implement particular data types when executed by one or more processors in a computer or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, or equivalents to such embodiments. Accordingly, the subject disclosure does not preclude inclusion of such modifications, variations, or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, or equivalents.

What is claimed is:

1. A headless content management computing system comprising:
   one or more processors; and
   one or more one or more non-transitory computer-readable media storing instructions that are executable to cause the one or more processors to perform operations, the operations comprising:
   maintaining a key values dictionary comprising at least a first feature, a first threshold utilization level associated with the first feature, and a second threshold utilization level associated with the first feature;
   obtaining data indicative of initiation of a user session via a user interface of a user device, wherein the user interface comprises interactive elements associated with a headless content management service;
   obtaining data indicative of a first utilization level for the first feature;
   obtaining a request for data associated with the first feature, the data comprising at least the first threshold utilization level and the second threshold utilization level;
   determining that the first utilization level is above the first threshold utilization level based on comparing the first utilization level to the first threshold utilization level;
   in response to determining that the first utilization level is above the first threshold utilization level, transmitting data which causes the user device to perform a first-tier action;
   obtaining data indicative of a second utilization level for the first feature;
   determining that the second utilization level is above the second threshold utilization level based on comparing the second utilization level to the second threshold utilization level; and
   in response to determining that the second utilization level is above the second threshold utilization level, transmitting data which causes the user device to perform second-tier action.

2. The computing system of claim 1, the operations further comprising:
   determining a frequency of the first utilization level being above the first threshold utilization level; and
   in response to determining the frequency of the first utilization level being above the first threshold utilization level, updating the first threshold utilization level for the first feature.

3. The computing system of claim 1, wherein the second-tier action comprises transmitting data which blocks the user device from utilizing the first feature.

4. The computing system of claim 1, wherein the data associated with the first feature is obtained by an application programming interface (API) component, wherein the API component performs operations comprising:
   obtaining data indicative of a request for data associated with the first feature;
   obtaining data comprising the first threshold utilization level and the second threshold utilization level; and
   transmitting a data structure comprising the first threshold utilization level and the second threshold utilization level to cause the user device to perform the first-tier action.

5. The computing system of claim 1, wherein the first-tier action comprises transmitting data which causes a warning message to be provided for display via the user interface of the user device.

6. The computing system of claim 1, the operations further comprising:
   obtaining data indicative of initiation of a second user session via a second user interface of a second device;
   obtaining data indicative of a third utilization level for the first feature;
   determining a third threshold utilization level based at least in part on the first utilization level and the third utilization level, wherein the third threshold utilization level is set to optimize system resource allocation;
   comparing the third threshold utilization level to the third utilization level; and
   in response to determining that the third utilization level exceeds the third threshold utilization level, performing the first-tier action.

7. The computing system of claim 1, the operations further comprising:
   obtaining data indicative of a plurality of utilization levels associated with a plurality of respective users' utilization of the first feature;
   obtaining data indicative of one or more characteristics of each respective user of the plurality of respective users;
   generating, using a machine learned model, a first custom threshold utilization level associated with the first feature and a second custom threshold utilization level associated with the first feature based at least in part on the plurality of utilization levels associated with the plurality of respective users and a first characteristic of the one or more characteristics of each respective users; and
   updating the key values dictionary to comprise data comprising the first feature, the first custom threshold utilization level, the second custom threshold utilization level, and the first characteristic.

8. The computing system of claim 7, the operations comprising:
   obtaining data indicative of initiation of a second user session via a user interface of a second user device, wherein the user interface comprises interactive elements associated with a headless content management service;
   obtaining data indicative of a second characteristic associated with the second user;
   determining that the second characteristic associated with the second user is the same as the first characteristic based on comparing the first characteristic and the second characteristic; and
   applying the first custom threshold utilization level and the second custom threshold utilization level to the second user session based on the second characteristic being the same as the first characteristic.

9. The computing system of claim 7, wherein the one or more characteristics comprises at least one of (i) user role, (ii) user permissions, or (iii) user associations.

10. A computer implemented method for headless content management system comprising:
    obtaining data indicative of initiation of a user session via a user interface of a user device;
    obtaining data indicative of a first utilization level for a first feature;
    obtaining data associated with the first feature, the data comprising at least a first threshold utilization level and a second threshold utilization level;
    comparing the first utilization level to the first threshold utilization level;
    determining that the first utilization level is above the first threshold utilization level; and in response to determining that the first utilization level is above the first threshold utilization level, transmitting data which causes the user device to perform a first-tier action.

11. The computer implemented method of claim 10, further comprising:
obtaining data indicative of a second utilization level for the first feature;
comparing the second utilization level to the second threshold utilization level;
determining that the second utilization level is above the second threshold utilization level; and
in response to determining that the second utilization level is above the second threshold utilization level, transmitting data which causes the user device to perform second-tier action.

12. The computer implemented method of claim 11, further comprising:
maintaining a key values dictionary comprising at least the first feature, the first threshold utilization level associated with the first feature, and the second threshold utilization level associated with the first feature;
determining a frequency of the first utilization level being above the first threshold utilization level; and
in response to determining the frequency of the first utilization level being above the first threshold utilization level, updating the first threshold utilization level for the first feature.

13. The computer implemented method of claim 11, wherein the second-tier action comprises transmitting data which blocks the user device from utilizing the first feature.

14. The computer implemented method of claim 10, wherein the data associated with the first feature is obtained by an application programming interface (API) component, wherein the API component performs operations comprising:
obtaining data indicative of a request for data associated with the first feature;
obtaining data comprising the first threshold utilization level and the second threshold utilization level; and
transmitting a data structure comprising the first threshold utilization level and the second threshold utilization level to cause the user device to perform the first-tier action.

15. The computer implemented method of claim 10, wherein the first-tier action comprises transmitting data which causes a warning message to be provided for display via the user interface of the user device.

16. The computer implemented method of claim 10, further comprising
obtaining data indicative of initiation of a second user session via a second user interface of a second device;
obtaining data indicative of a third utilization level for the first feature;
determining a third threshold utilization level based at least in part on the first utilization level and the third utilization level, wherein the third threshold utilization level is set to optimize system resource allocation;
comparing the third threshold utilization level to the third utilization level; and
in response to determining that the third utilization level exceeds the third threshold utilization level, performing the first-tier action.

17. The computer implemented method of claim 12, further comprising:
obtaining data indicative of a plurality of utilization levels associated with a plurality of respective users' utilization of the first feature;
obtaining data indicative of one or more characteristics of each respective user of the plurality of respective users;
generating, using a machine learned model, a first custom threshold utilization level associated with the first feature and a second custom threshold utilization level associated with the first feature based at least in part on the plurality of utilization levels associated with the plurality of respective users and a first characteristic of the one or more characteristics of each respective users; and
updating the key values dictionary to comprise data comprising the first feature, the first custom threshold utilization level, the second custom threshold utilization level, and the first characteristic.

18. The computer implemented method of claim 17, further comprising:
obtaining data indicative of initiation of a second user session via a user interface of a second user device, wherein the user interface comprises interactive elements associated with a headless content management service;
obtaining data indicative of a second characteristic associated with the second user;
determining that the second characteristic associated with the second user is the same as the first characteristic based on comparing the first characteristic and the second characteristic; and
applying the first custom threshold utilization level and the second custom threshold utilization level to the second user session based on the second characteristic being the same as the first characteristic.

19. The computer implemented method of claim 17, wherein the one or more characteristics comprises at least one of (i) user role, (ii) user permissions, or (iii) user associations.

20. One or more non-transitory computer readable media storing instructions that are executable by one or more processors to perform operations comprising:
maintaining a key values dictionary comprising at least a first feature, a first threshold utilization level associated with the first feature, and a second threshold utilization level associated with the first feature;
obtaining data indicative of initiation of a user session via a user interface of a user device, wherein the user interface comprises interactive elements associated with a headless content management service;
obtaining data indicative of a first utilization level for the first feature;
obtaining data associated with the first feature, the data comprising at least the first threshold utilization level and the second threshold utilization level;
determining that the first utilization level is above the first threshold utilization level based on comparing the first utilization level to the first threshold utilization level;
in response to determining that the first utilization level is above the first threshold utilization level, transmitting data which causes the user device to perform a first-tier action;
obtaining data indicative of a second utilization level for the first feature;

determining that the second utilization level is above the second threshold utilization level based on comparing the second utilization level to the second threshold utilization level; and in response to determining that the second utilization level is above the second threshold utilization level, transmitting data which causes the user device to perform second-tier action.

* * * * *